(12) United States Patent
Kita

(10) Patent No.: US 7,546,032 B2
(45) Date of Patent: Jun. 9, 2009

(54) ELECTRONIC CAMERA HAVING LIGHT-EMITTING UNIT

(75) Inventor: Kazunori Kita, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 532 days.

(21) Appl. No.: 11/238,028

(22) Filed: Sep. 28, 2005

(65) Prior Publication Data

US 2006/0067668 A1 Mar. 30, 2006

(30) Foreign Application Priority Data

Sep. 30, 2004 (JP) ............................ 2004-287526

(51) Int. Cl.
*G03B 15/03* (2006.01)
(52) U.S. Cl. ...................... 396/182; 396/155
(58) Field of Classification Search ................ 396/176, 396/180, 182, 201, 296, 155, 164; 348/370–371, 348/223.1, 224.1, 225.1; 362/5, 11
See application file for complete search history.

(56) References Cited

U.S. PATENT DOCUMENTS

| | | | |
|---|---|---|---|
| 7,002,624 B1* | 2/2006 | Uchino et al. ............ | 348/225.1 |
| 2004/0246348 A1* | 12/2004 | Takeshita ................ | 348/223.1 |
| 2005/0047771 A1* | 3/2005 | Yuyama ................. | 396/155 |

FOREIGN PATENT DOCUMENTS

| | | |
|---|---|---|
| JP | 63-261331 A | 10/1988 |
| JP | 9-266579 A | 10/1997 |
| JP | 2003-215674 A | 7/2003 |

OTHER PUBLICATIONS

Japanese Office Action dated Jan. 8, 2008 issued in counterpart Japanese Application No. 2005-256558.

* cited by examiner

*Primary Examiner*—Bot LeDynh
(74) *Attorney, Agent, or Firm*—Frishauf, Holtz, Goodman & Chick, P.C.

(57) ABSTRACT

An electronic camera comprises a light-emitting unit 38 for emitting light, color components of which can be changed; a color-component measuring unit 51 for obtaining color components involved in any one of light from a light source for illuminating an object and light reflected by the object; an input-image processing unit 52 for determining color components of light to be emitted based on the color components calculated by the color-component measuring unit; and a light-emitting member driving unit 39 for making the light-emitting unit emit light involving the color components determined by the input-image processing unit in response to an instruction of photographing given by a user.

9 Claims, 32 Drawing Sheets

FIG. 1
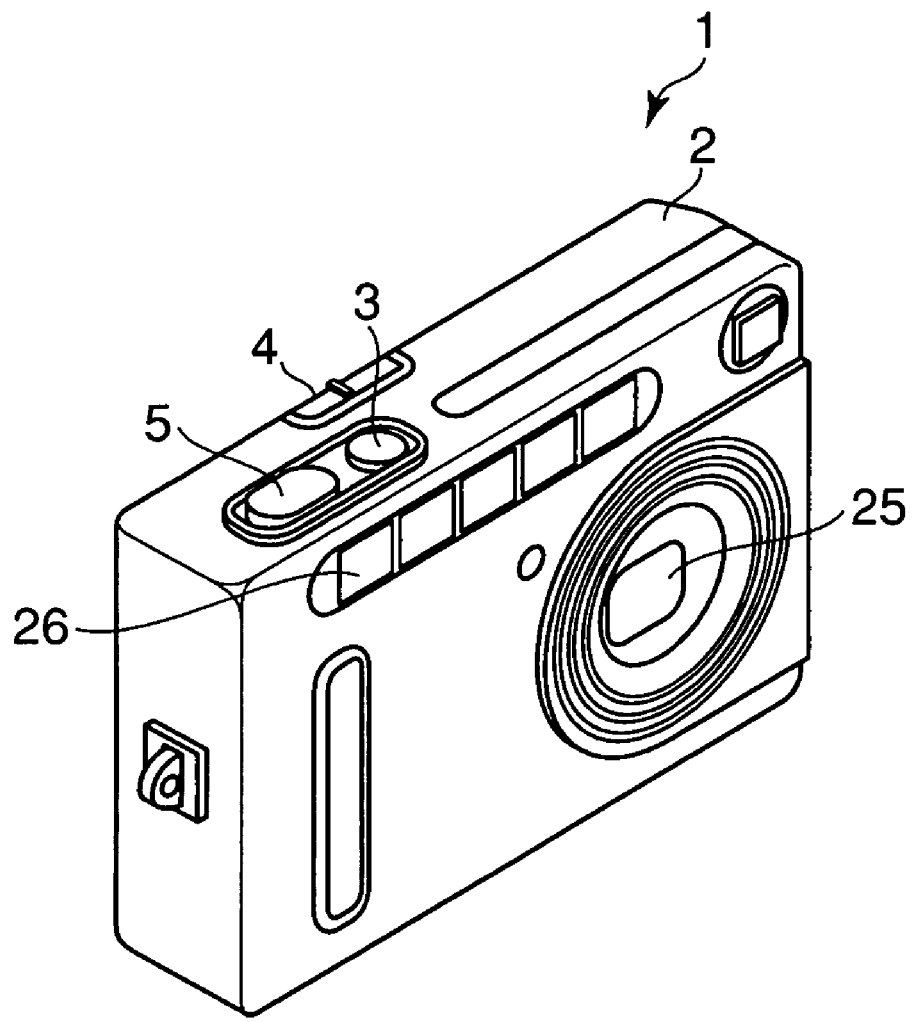
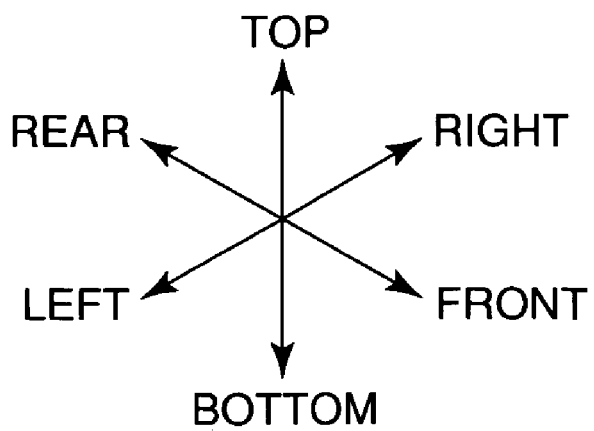

EXPRESS IN CHROMATIC COORDINATE (INDEX)

COLOR TEMPERATURE (INDEX, VALUE)

CEASE LIGHT    EMIT LIGHT

ELECTRONIC CAMERA HAVING LIGHT-EMITTING UNIT

This application claims foreign priority based on Japanese Patent application No. 2004-287526, filed Sep. 30, 2004, the content of which is incorporated herein by reference in its entirety.

BACKGROUND OF THE INVENTION

1. Field of the Invention

The present invention relates to an electronic camera, and more particularly, to an electronic camera which is capable of correcting a color temperature characteristic and spectral distribution characteristic of flashlight.

2. Description of Prior Art

In general, when an object or person is photographed with strobe light, an image photographed under front lighting shows a rather flat image. Therefore, an oblique lighting, side lighting, or combination thereof are used to stress clear-cut feature, shadows and look solid of a face of the person to be photographed, thereby describing minute facial expression.

To realize the oblique lighting or side lighting, an illuminating device and detachable flashlight-emitting device, and the like are used. In the illuminating device and flashlight-emitting device, a light-emitting member of a large guide number (herein after, "GN") is used, which GN represents light intensity (light-emitting amount) of the flashlight. These illuminating device and flashlight-emitting device are provided with a mechanism for using light reflected on a ceiling to indirectly illuminate the object, and a function of changing a range of light-emitting angle to increase a light reaching distance. When strobe-light photography or strobe-light shooting is performed using the flashlight-emitting device, once strobe-light shooting has finished, the user has to wait before starting another shooting until a capacitor for emitting light is charged completely in the flashlight-emitting device. Along charging time of the capacitor increases a shooting interval, and as a result, the user often loses a shooting chance.

It is known that the light-emitting member can emit light, when the capacitor is charged to a voltage at which the member can emit light, even if the capacitor has not yet been charged completely. A camera using this feature of the capacitor has been developed, which has a function of prioritizing exposure operation by temporarily interrupting charging operation of the capacitor.

In this kind of camera, since its flashmatic unit automatically sets the guide number (GN) determined on the assumption that the capacitor is charged completely, an error in guide number can cause an error in aperture value which is determined based on the guide number and the distance to the object, resulting shooting with under exposure.

SUMMARY OF THE INVENTION

According to one aspect of the invention, there is provided an electronic camera which comprises a light-emitting unit for emitting light, color components of which can be changed; a color-component obtaining unit for obtaining color components involved in any one of light from a light source for illuminating an object and light reflected by the object; a color-component determining unit for determining color components of light to be emitted by the light-emitting unit based on the color components obtained by the color-component obtaining unit; and a light-emitting control unit for making the light-emitting unit emit light involving color components determined by the color-component determining unit.

BRIEF DESCRIPTION OF THE DRAWINGS

FIG. 1 is a perspective view of an electronic camera according to the present invention.

EMBODIMENTS OF THE INVENTION

Figure 2:
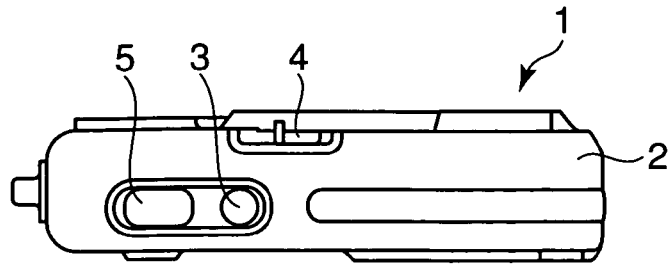
FIG. 2 is a plane view of the electronic camera according to the present invention.

Now, the best embodiments for carrying out the invention will be described with reference to the accompanying drawings. The embodiments to be described hereinafter include various technically preferable restrictions added thereto, but the scope of the invention should not be limited to the embodiments with these restrictions or exemplarily illustrated embodiments. An electronic camera 1 according to embodiments of the present invention will be described with reference to the accompanying drawings.

As shown in FIG. 1, the electronic camera 1 according to the embodiment of the invention has a housing 2 formed in a generally rectangular block. On an upper surface of the housing 2 are provided a power button 3, mode switching unit 4, and shutter button 5, as shown in FIG. 1 to FIG. 4.

The power button 3 comprises a push button switch, which turns on or off the power in an alternate manner, when depressed. The mode switching unit 4 is a slid switch, which is slidable in a determined direction.

A "photograph-mode", "play-back mode", or "setting mode" is selectively set by operating the mode switching unit 4. The photograph mode includes a "normal photograph-mode" and "bracket photograph-mode". The setting mode includes a "normal setting mode" and "bracket setting mode".

The shutter button 5 comprises a push button switch, and gives an instruction of release the shutter when depressed in the photograph mode. The shutter button is arranged to give an instruction of executing a command on a guide screen or selection screen in the play-back mode or setting mode, when depressed. An electric signal from the shutter button 5 is sent to an input circuit 6 provided in the housing 2, as shown in FIG. 5.

Figure 3:
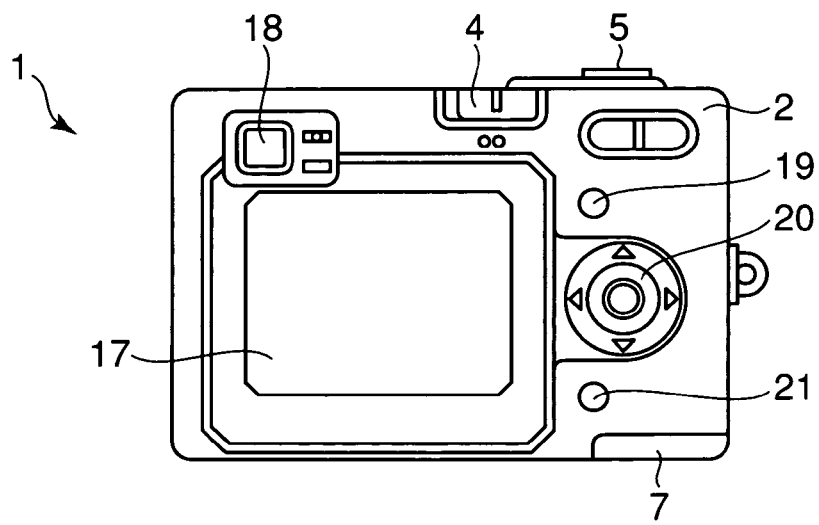
FIG. 3 is a rear view of the electronic camera according to the present invention.
Figure 4:
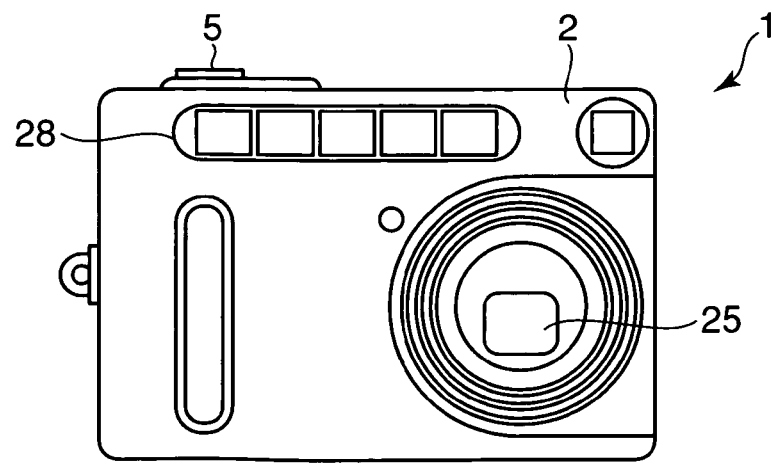
FIG. 4 is a front view of the electronic camera according to the present invention.
Figure 5:
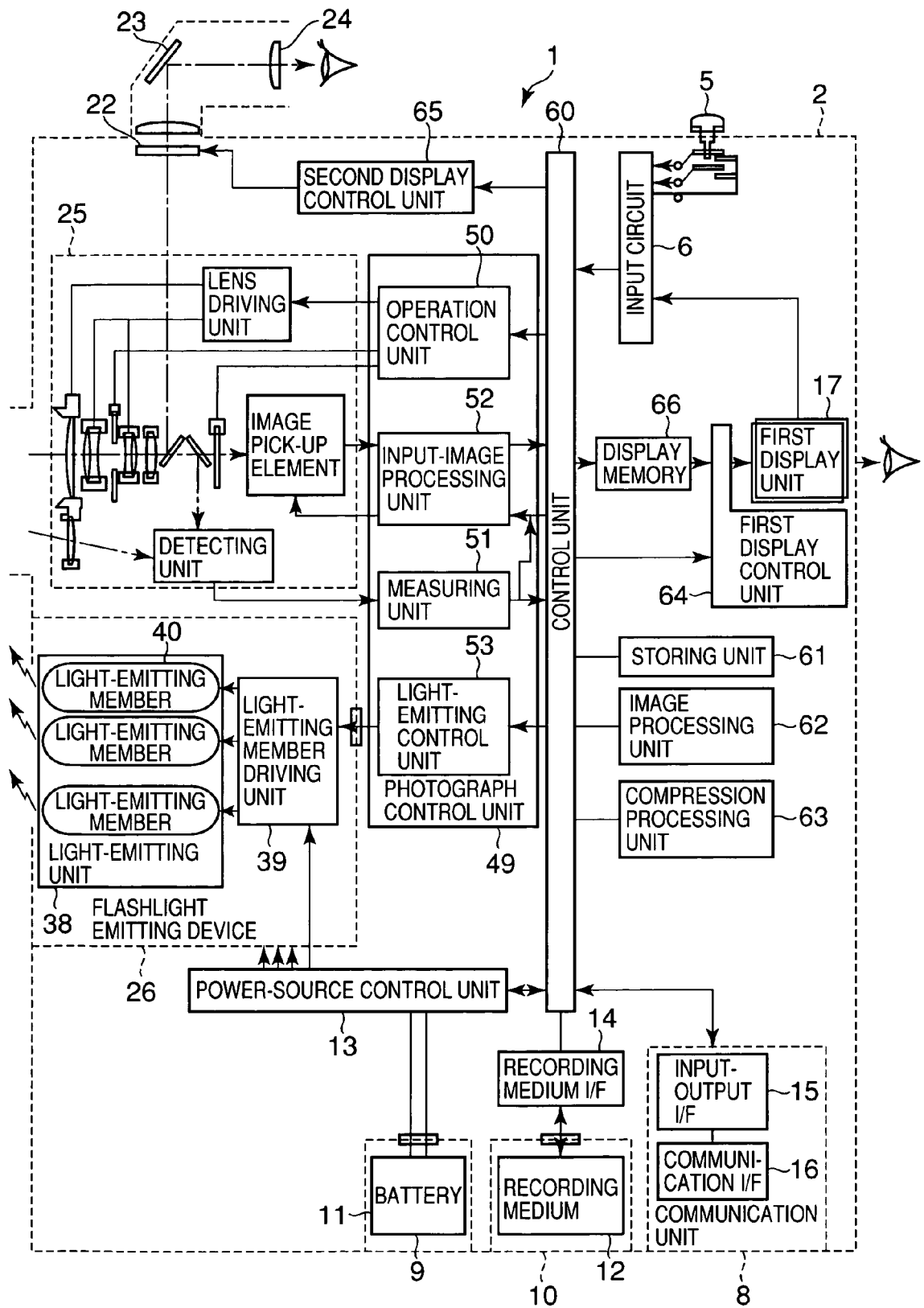
FIG. 5 is a block diagram of a circuit configuration of the electronic camera according to the present invention.

As illustrated in FIG. 3 to FIG. 5, on a bottom of the housing 2 are provided a plate-like cover 7 which can be opened, and a communication unit 8.

The housing 2 is provided with two hollow storage portions 9, 10 inside the cover 7, in which storage portions a power battery 11 and a recording medium 12 such as a memory card are detachably received, respectively.

The battery storage portion 9 is electrically connected to a power-source control unit 13. Therefore, the battery 11 received therein can supply current to the power-source control unit 13.

The memory storage portion 10 is provided with a recording medium I/F 14. Through the recording medium I/F 14, image data and the like are exchanged between the electronic camera 1 and the recording storage 12 received in the storage portion 10.

The communication unit 8 is provided with an input-output I/F 15, and communication I/F 16 such as USB, and LAN. Through the input-output I/F 15, imaged at a and the like are exchanged between the electronic camera 1 and an external device connected to the communication I/F 16.

On a rear surface of the housing 2, there are provided a first display unit 17, optical finder 18, guidance display button 19, operation button 20, and screen-display button 21, as shown in FIG. 3.

The first display unit 17 comprises LCD (Liquid Crystal Display), which serves as an electronic finder for displaying an object and various information such as photographing information relating to photographing conditions and setting information in the photograph-mode, and which displays various guidance screens or instruction screens, or a selected image in the play-back mode. Further, the first display unit 17 is provided with a touch panel function for a user to input various instructions with his or her finger or a pen.

The optical finder 18 comprises a second display unit 22, a finder mirror 23 and a finder lens 24, as shown in FIG. 5. On the second display unit 22 are displayed various sorts of information such as composition of an image to be photographed and a focal length. The image and other are inverted by the finder mirror 23 and visually confirmed by the user through the finder lens 24. The guidance-display button 19 comprises a push-button switch. The user can select various guidance screens by depressing the guidance-display button 19.

The operation button 20 consists of a cross key which can be depressed at four or cross positions around its center, and is arranged for selecting a command displayed in the guidance screen or instruction screen, when depressed.

The screen-display button 21 consists of a push-button switch. By depressing the screen-display button 21, the user can select whether to display various sorts of information or to display a through image on the first display unit, or select sorts of information to be displayed thereon.

As shown in FIG. 1 and FIG. 4, on a front surface of the housing 2, there are provided an image pick-up unit 25 and flashlight emitting device 26.

The image pick-up unit 25 comprises a lens unit 27, mirror unit 28, shutter 29, and image pick-up element 30. These units are arranged along the axis of light flux or beam (hereinafter, referred to as "beam") entered from the front surface of the housing 2 in the order of lens unit 27, mirror unit 28, shutter 29 and the image pick-up element 30.

Figure 6:
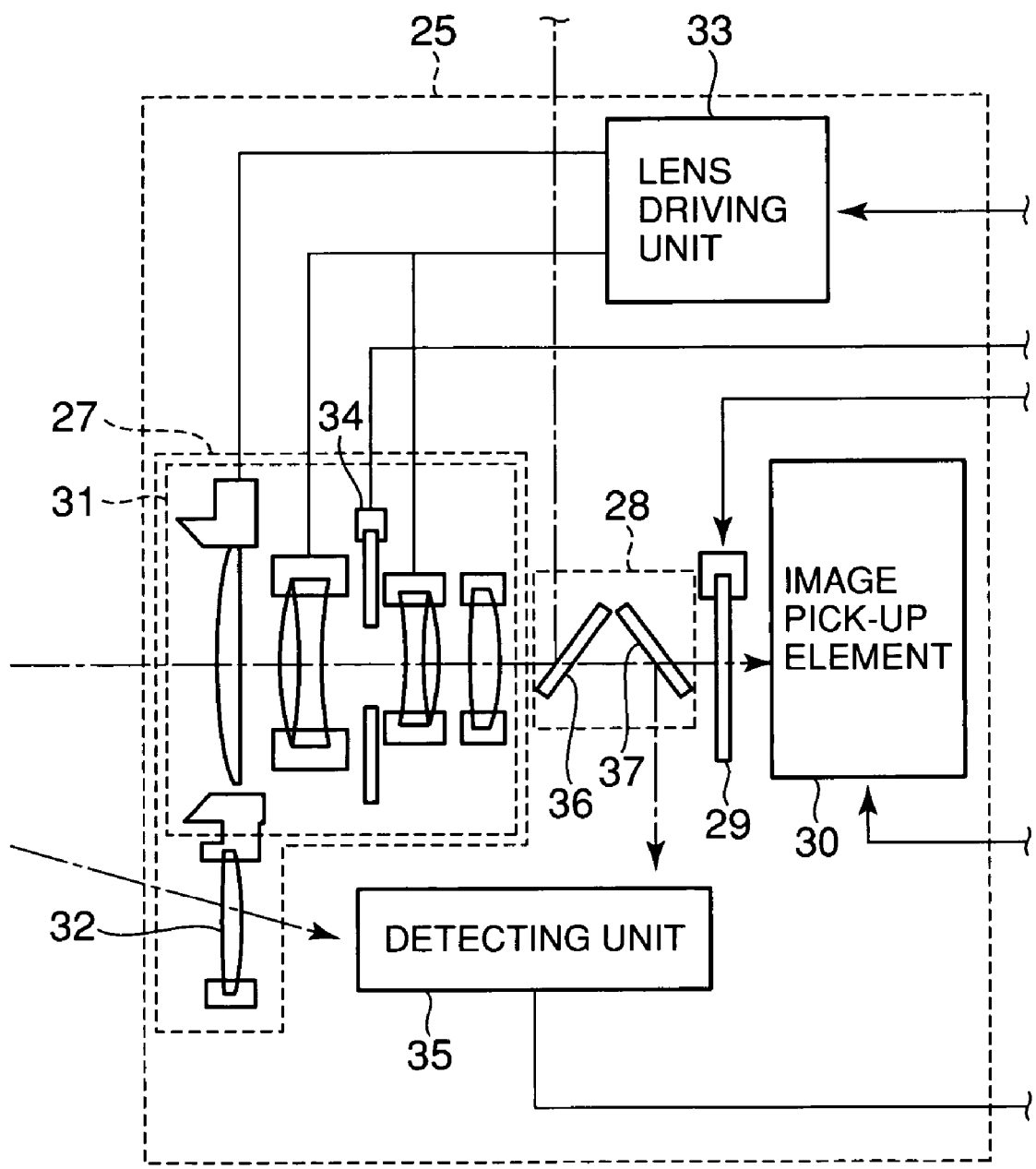
FIG. 6 is an enlarged plane view illustrating a part of the electronic camera according to the present invention.

The lens unit 27 comprises an optical image pick-up lens system 31 and a single measurement lens 32. The image pick-up lens system 31 further comprises six spherical lenses including two sets of doublet lenses, each of which consists of a combination of a convex lens and concave lens stacked together, as shown in FIG. 6.

The lenses in the image pick-up lens system 31 are provided with a lens driving unit 33 for adjusting the lens positions along the optical axis of beam, whereby the focal length is adjusted. Further, the image pick-up lens system 31 has an aperture mechanism 34 provided between certain lenses. To adjust an amount of beam entering into the housing 2, the aperture mechanism 34 has an aperture which can be adjusted in accordance with movement of plural aperture rings which are disposed petaloid like and connected to a connecting ring.

The measurement lens 32 is provided within the housing 2, and a detecting unit 35 is provided behind the measurement lens 32 to receive the beam. The detecting unit 35 detects beam amount and beam intensity based on the received beam.

The mirror unit 28 comprises a main mirror 36 and subsidiary mirror 37, the surfaces of both mirrors being subjected to mirror-like finishing.

The main mirror 36 is disposed so as to intersect with the optical axis of the beam at a certain angle, and to turn upward about one end of the rear surface of the mirror 36 at the time when the shutter button 5 is depressed. The main mirror 36 has a semi-transparent portion. Most of the beams or flux entered to the main mirror 36 through the image pick-up lens system 31 are reflected by the main mirror 36 toward the second display unit 22, but a part of the beam entered to the semi-transparent portion is guided to a plane opposite to the incidence plane to be output against the subsidiary mirror 37.

The beam passing through the main mirror 36 is guided to the subsidiary mirror 37 to be output to the detecting unit 35. The shutter 29 serves as an electronic shutter, open or close operation, or a running speed of which is controlled based on an electric signal. When beam amount entering through the lens unit 27 is not-sufficient, a driving mechanism controls the running speed to adjust open-close time of the shutter 29, or a time duration in which the beam enters into the image pick-up element 30.

A vertically running shutter system which opens or closes in the vertical direction or a horizontally running shutter system which opens or closes in the horizontal direction maybe employed as an open-close system of the shutter 29. The shutter used in the present embodiment is an electronic shutter, but is not limited to this electronic shutter, and a mechanical shutter which is mechanically controlled may be used.

The image pick-up element 30 comprises an image sensor such as CCD (Charge Coupled Device), CMOS (Complementary Metal Oxide Semiconductor), and the like, which converts an optical image of an object entered through the image pick-up lens system 31 of the lens unit 27 into an electric signal and outputs same. The flashlight emitting device 26 comprises a light-emitting unit 38 and a light-emitting member driving unit 39, as illustrated in FIG. 5.

The light-emitting unit 38 further comprises plural light-emitting members 40. As these light-emitting members 40, for example, are used flashlight discharging lamps such as a xenon lamp, which are disposed in a longitudinal direction. The light-emitting unit 38 is not limited to the arrangement including plural light-emitting members but such arrangement may be used in the light-emitting unit 38 that a single light-emitting member is divided onto plural sections.

Figure 7:
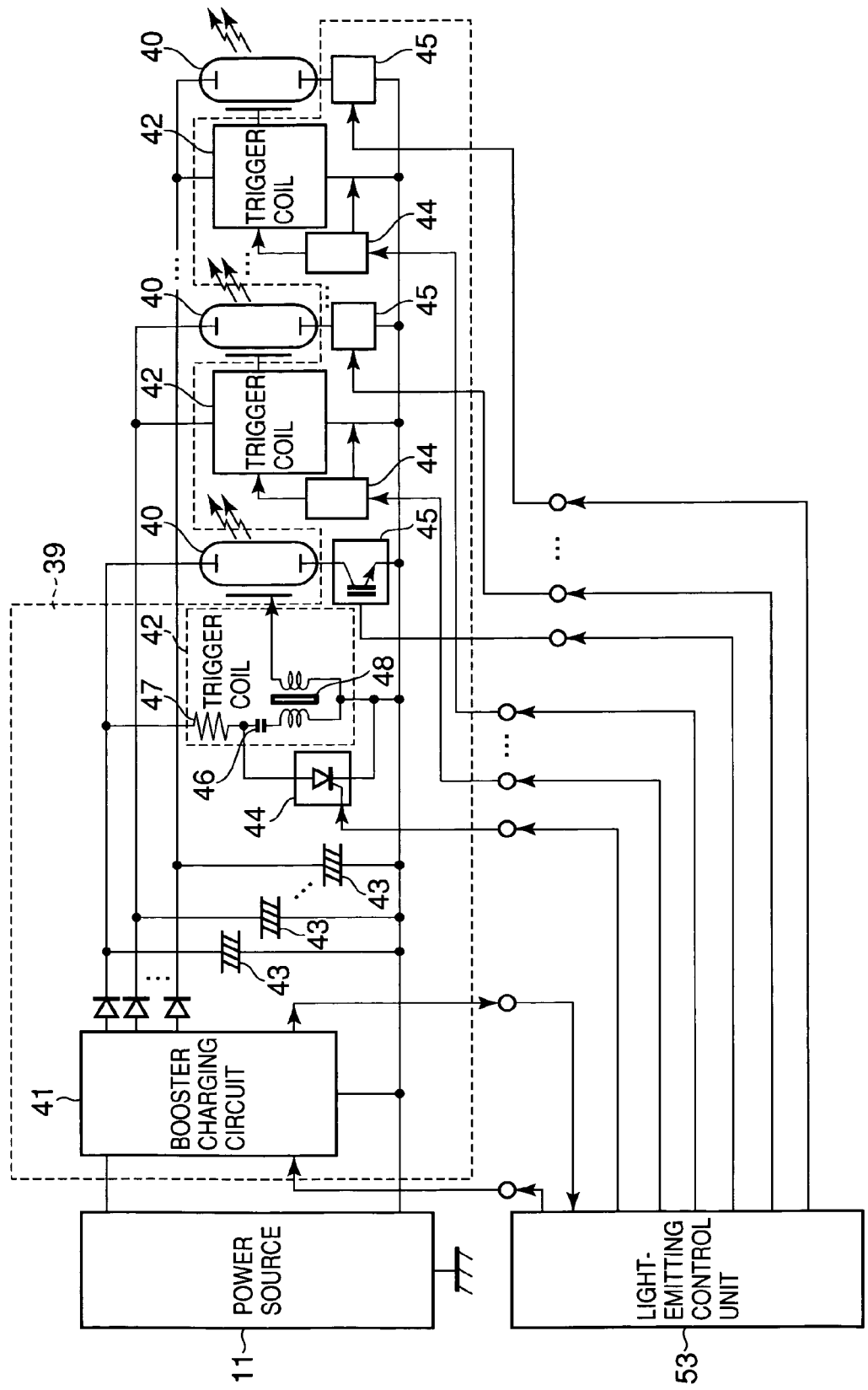
FIG. 7 is a block diagram of a circuit configuration of a flashlight emitting device using Xenon lamps as light-emitting members.
Figure 8:
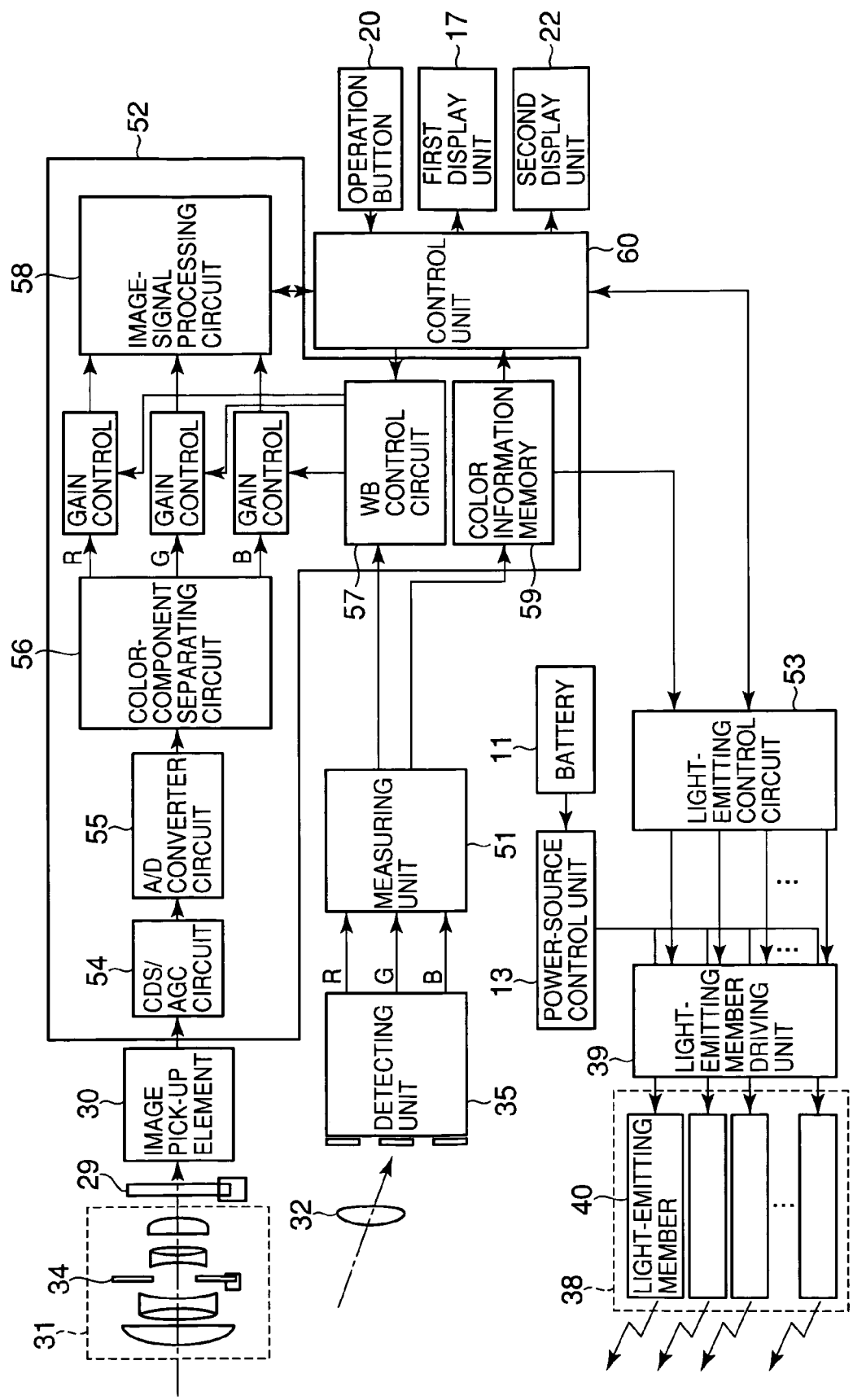
FIG. 8 is a block diagram of a circuit configuration of an input-image processing unit.

As shown in FIG. 7, the light-emitting member driving unit 39 comprises a booster charging circuit 41, plural trigger coils 42, plural main capacitors 43, plural trigger switches 44, and plural light-emit ceasing switching elements 45.

The booster charging circuit 41 works to raise battery voltage of 3.0 to 4.2 volts to about 330 volts, and supplies to the main capacitors 43.

The trigger coil 42 includes trigger capacitor 46, trigger resistor 47, and coil 48. Charge stored in the main capacitor 43 and the trigger capacitor 46 is simultaneously discharged through the primary coil of the coil 48 to generate a trigger voltage of about 3300 volts at the secondary coil of the coil 48.

The main capacitors 43 are provided for the light-emitting members 40, respectively, and charged by voltage of the booster charging circuit 41.

The trigger switch 44 comprises a thyristor of high voltage resistance and high speed characteristic, power FET (Field Effect Transistor), or IGBT (Insulated Gate Bipolar Transistor). The light-emitting ceasing switching element 45 works in response to a trigger signal.

The light-emitting ceasing switching element 45 comprises a switching element of high voltage resistance, and outputs a light-emitting ceasing signal to the trigger coil 42.

Each light-emitting member 40 is provided with the light-emitting member driving unit 39 including one trigger coil 42, main capacitor 43, trigger switch 44 and light-emitting ceasing switching element 45. In other words, one circuit combination consists of a light-emitting member 40, trigger coil 42, main capacitor 43, trigger switch 44 and light-emitting ceasing switching element 45.

Within the housing 2, there is provided a photograph-control unit 49, which comprises an operation-control unit 50, measuring unit 51, input-image processing unit 52, and light-emitting control unit 53.

The operation-control unit 50 outputs an electric signal to make the lens-driving unit control a certain lens in an image pick-up lens system 31 so as to adjust a focal length. Further, operation-control unit 50 controls the connecting ring of the aperture mechanism 34 and the driving mechanism of the shutter 29 to adjust spherical aberration of lens and the running speed of the shutter 29.

The measuring unit 51 calculates a measurement light-value, measurement distance and color temperature from beam amount and beam intensity detected by the detecting unit 35.

The input-image processing section 52 comprises CDS (Correlated Double Sampling)/AGC (Automatic Gain Control) circuit, A/D converter circuit 55, color-component separating circuit 56, WB control circuit 57, image-signal processing circuit 58 and color information memory 59.

CDS/AGC circuit eliminates noises included in an electric signal output from the image pick-up element 30 and, when the level of the electric signal from the image pick-up element 30 is low due to short of an exposure time, amplifies the signal up to an appropriate level. The amplified signal is supplied to A/D converter circuit.

A/D converter circuit converts input analog image data into digital image data.

The color-component separating circuit 56 uses difference between color signals included in the input image data to obtain R, G, B color components separately. These R, G, B color components are supplied to the following image-signal processing circuit 58.

The WB control circuit 57 adjusts these R, G, B color components to equalize the balance among them. That is, the integration value of achromatic color portion of a photographed image derived by the measuring unit 51 and an average value of differences (R–Y), (B–Y) between the color component and luminance component are arranged to become zero. It is also arranged such that when color temperature calculated by the measuring unit 51 is high, a gain of R component is increased, and a gain of B component is decreased, and that when color temperature calculated by the measuring unit 51 is low, the gain of B component is increased, and the gain of R component is decreased.

The image-signal processing circuit 58 receives the color signal, the gain of which has been adjusted, performs various processes on the color signal, and outputs same to a control unit 60 to be described later.

The light-emitting control unit 53 controls a light-emitting value, light-emitting time duration, the number of times of light emitting, light-emitting interval or light-emitting position of light emitted by the light-emitting unit 38, whereby color tone, color temperature or spectral distribution characteristic of luminescent color is adjusted in accordance with component ratio of color signals calculated by the measuring unit 51 and color temperature information. The light-emitting control unit 53 may be modified so as to control the light-emitting value and light-emitting time duration based on a measured light value for adjustment in previous light-emitting or a measured light value for adjustment in main light-emitting.

The photograph-control unit 49 is connected to the control unit 54 including CPU (Central Processing Unit). The photograph-control unit 54 calculates and processes input data to obtain an appropriate exposure amount from the measured light amount in accordance with photographing conditions set by the user.

Further, the photograph-control unit 49 controls the WB control circuit 57 in the input-image processing unit 52 on the basis of WB setting information set by operation of the user, and displays on the first and second display unit 17, 22 a chromatic coordinate and color temperature recorded in the color information memory 59 in the input-image processing unit 52 together with a photographed image.

The control unit 60 is connected with a storing unit 61, image processing unit 62, compression processing unit 63, and display control units 64, 65.

The storing unit 61 comprises a volatile RAM (Random Access Memory) for temporarily storing information and a non-volatile ROM (Read Only Memory) for storing information.

In ROM are stored various sorts of system programs, application programs and data. Meanwhile, RAM has a program area for expanding a program and a data area for storing data supplied from the operation button 20 and various processing results obtained by the control unit 60.

The image processing unit 62 performs various image processing processes, including an image complementation process, gamma correction, and the like, on image data signal obtained by the image pick-up element 30.

The compression processing unit 57 compresses image data to encode same, and expands the image data to decode same in conformity with various data compression standards such as JPEG (Joint Photographic Expert Group), MPEG 4 (Moving Picture Expert Group) and TFII (Tagged Image File Format).

The display control units 64, 65 comprise a first display control unit 64 and a second display control unit 65. The display control units 64, 65 convert image data supplied from the photograph-control unit 49 into a video signal, based on a display signal input from the control unit 60, and output the video signal to both the first display unit 17 and the second display unit 22. The first display unit 17 is provided with a display memory 66 for temporarily storing digital image data.

Now, operation of the electronic camera 1 according to the embodiments of the invention will be described.

In preparation for operating the electronic camera 1, the mode switching unit 4 is operated in a sliding manner to set a setting mode, where various photographing conditions are set whereby any one of "compulsion light emitting", "light emitting prohibition", and "automatic light emitting" is selected. Further, when it is confirmed that the main capacitor has not yet been charged sufficiently, the battery voltage of 3.0 to 4.2 volts is raised to about 330 volts by the booster charging circuit 41 of the light-emitting member driving circuit 39 in the flashlight emitting device 26.

Then, switching to the photograph mode by sliding the mode switching unit 4, the user moves the electronic camera 1 to decide a photographing composition, while reviewing a through image displayed on the first and second display unit 17, 22.

When the user has depressed the shutter button 5 at the time when his or her desired image is displayed on the optical finder 18 or the first display unit 17, image data obtained by the image pick-up unit 25 is output to the first display unit 17 through the input-image processing unit 25 and the control unit 60, and is recorded on the built-in storing unit 61. or on detachable recording medium 12 received in the housing 2. Then, a series of photographing operations are finished.

Strobe photographing operation in which luminescent color of the flashlight is automatically set based on the WB setting information and color temperature information will be described in detail with reference to FIG. 9 to FIG. 12.

Figure 9:
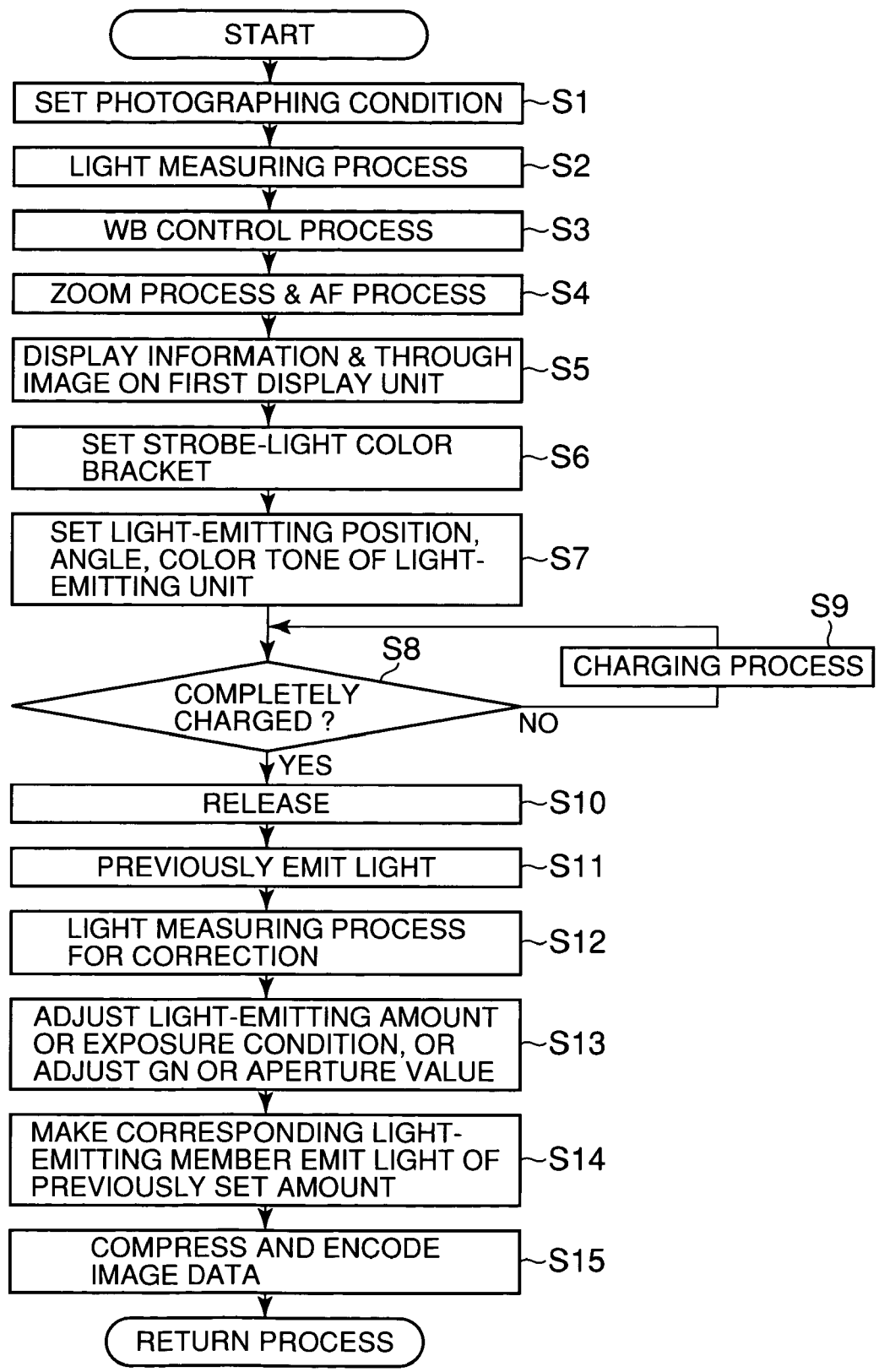
FIG. 9 is a flow chart exemplarily showing processes performed based on WB setting information in the strobe-light photography.

First, photographing conditions including exposure condition are set at step S1 in FIG. 9, and a light measuring process is executed at step S2. WB control circuit 57 performs WB control process in accordance with color temperature information of light from the light source or light reflected by the object at step S3.

Further, after a zoom process and AF (Automatic Focusing) process have been executed successively at step S4, a through image of the object is displayed on the first display unit 17 together with the photographing information such as photographing conditions and setting information.

Figure 10:
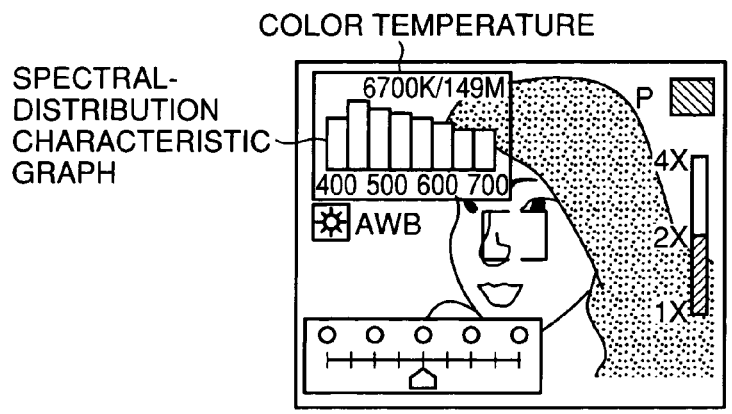
FIG. 10 is a schematic view exemplarily illustrating display-information displayed on a first display unit.
Figure 11:
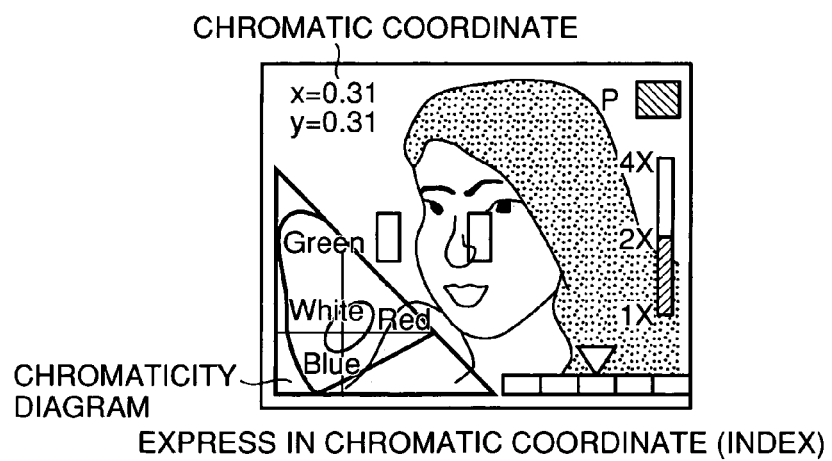
FIG. 11 is a schematic view exemplarily illustrating other display-information displayed on the first display unit.
Figure 12:
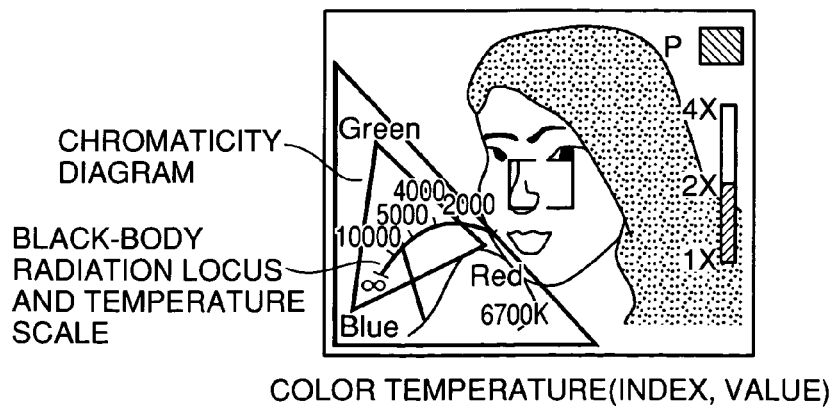
FIG. 12 is a schematic view exemplarily illustrating still other display-information displayed on the first display unit.

On the first display unit 17 are displayed WB setting values such as typical values of a chromatic coordinate value of the light source, relative color temperature in terms of Kelvin unit (K) or mired unit (mrd), or LB index of a color conversion filter, as shown in FIG. 10. When the screen-display button 21 is depressed, a bar graph or sequential line graph, and a chromaticity diagram such as x-y chromaticity diagram are displayed on the first display unit 17 together with the through image in a superimposed manner as shown in FIG. 11. Meanwhile, as shown in FIG. 12, a scale or pointer of the chromatic coordinate or color temperature is displayed on a black-body radiation locus in the chromaticity diagram.

Spectral distribution of light of the light source or light reflected by the object varies in various ways, and spectral distribution characteristic indicating a light value of each frequency, RGB components representing component values of three RGB color stimulus values, a chromaticity or color component of normalized brightness, and color temperature representing a color component based on the standards of the black-body radiation are typically used to represent color components included in the light of the light source or light reflected by the object.

After confirming these displayed information, the user sets "strobe-light angle bracket setting" active at step S6, and sets a light-emitting position and angle of the light-emitting unit 38 and color tone, and decides the number of the light-emitting members 40 for emitting light on the basis of the previously set WB setting information and color-temperature information of the light source at step S7.

Thereafter, it is confirmed at step S8 whether the main capacitor 43 of the light-emitting member driving unit 39 in the flashlight emitting device 26 has been charged completely. When the main capacitor 43 has not yet been charged completely (NO: step S8), the main capacitor 43 is charged at step S9.

When it is confirmed that the main capacitor 43 has been charged completely (YES: step S8), the user depresses the shutter button 5 at step S10. When the shutter button 5 is depressed, an automatic light-emitting adjusting function makes a part of the light-emitting unit 38 emit light previously at step S11, and receives light reflected by the object, whereby the light measuring process is performed for light adjustment at step S12. A light-emitting volume or exposure condition is adjusted on the basis of the previously set photographing condition and measured light amount of the previously emitted light, or GN and aperture value are adjusted so as to meet the following expressions (1), (2) at step S13.

$$GN \geq F \times L/(S/100)^{1/2} \quad (1)$$

Where F denoted an aperture value, L denotes a distance to the object to be photographed, and S represents ISO sensitivity.

$$F \leq [GN \times (S/100)^{1/2}]/L \quad (2)$$

where F denotes an aperture value, L denotes a distance to the object to be photographed, and S represents ISO sensitivity. The selected light-emitting member emits light under the photographing condition, light-emitting condition based on the measured light amount, and setting light amount, and the photographing operation is performed at step S14. Finally, an photographed image is compressed and encoded by the compression processing unit 63, and stored in the built-in storing unit 61 or in the detachable recording medium 12 at step S15, and then a series of strobe photographing operations are finished.

When continuous shooting with luminescent color and spectral characteristic of the light-emitting unit 38 corrected (strobe-light color bracket photography) is executed, various conditions have to be set before starting the photographing operation.

A method of setting photographing condition (hereinafter, "bracket condition") for the strobe-light color bracket photography and photographing operation will be described in detail with reference to FIG. 13 to FIG. 18.

Figure 13:
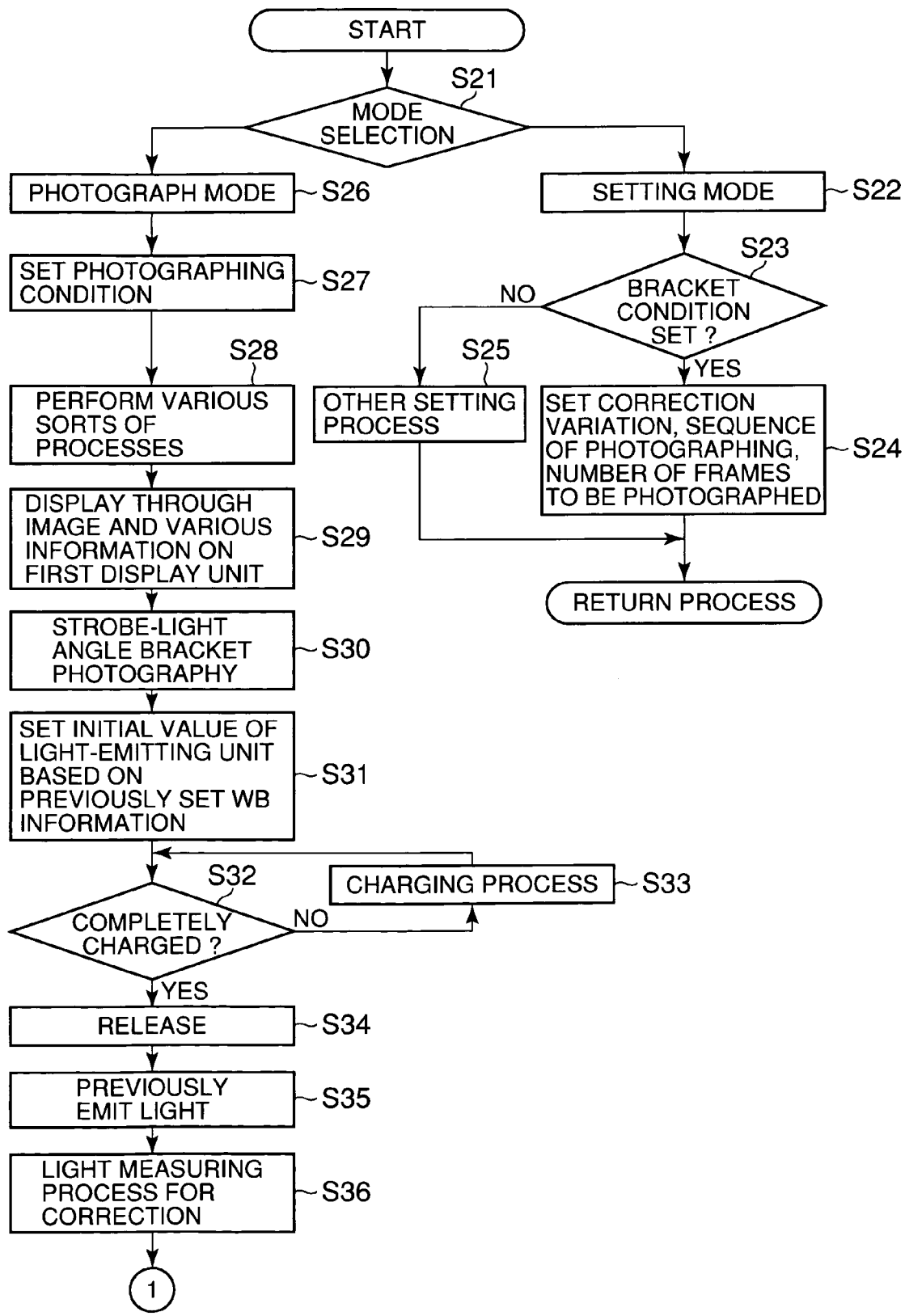
FIG. 13 is a flow chart exemplarily showing processes (1) performed in strobe color-light bracket photography.

First, the mode switching unit 20 is operated on the mode selection screen at step S21 in FIG. 13 to switch to the setting mode at step S22. The setting mode is further switched to the bracket photograph setting mode (YES: at step S22), in which the bracket conditions such as a correction interval, correction sequence or sequence of photographing, and total number of frames are set to desired values at step S24.

With respect to the correction interval, correction amounts ("$\Delta S$", "$\Delta \theta$") in a position "S" of the light-emitting member 40 emitting light in the light-emitting unit 38, and a light emitting angle "$\theta$" of the light-emitting member 40 (light emitting conditions) can be set for each photographing operation of obtaining one frame.

With respect to the correction sequence or photographing sequence, ascending sequence (plus direction, from right to left side of the object), descending sequence (minus direction, from left to right side of the object), a sequence of "0+−" (from center to left side, from left to right-side) or a sequence of "0−+" (from center to right side, from right to left side) can be selected and set.

For example, assuming that "0" is the initial condition with no correction made, when the number of frames is set to three in the ascending sequence, photographing operation is performed under photograph conditions where the light emitting position or light-emitting angle is changed in order of "−1 correction", "0: no correction", and "+1 correction".

When continuous shooting is performed with the light-emitting position corrected, if the initial light-emitting position is represented by S# as given by the following expression (3), the continuous shooting is performed in order of (S#−ΔS#), (S#) and (S#+ΔS#).

$$S\# = S\#0 - K \times \Delta S\# \quad (3)$$

where K is an arbitrary integer number.

Consequently, when the photographing sequence is set to "ascending sequence", and the total number of frames to be photographed is set to "3", and the initial position is set to "center", and a correction variation is set to "ΔS#=1", the continuous shooting is performed in corrected order of "right", "center", and "left".

When the number of frames to be photographed is changed to "5"in the bracket condition, then the continuous shooting is performed in order of "−2 correction", "−1 correction", "0: no correction made", "+1 correction", and "+2 correction", that is, in order of (S#−2ΔS#), (S#−ΔS#), (S#), (S#+ΔS#), and (S#+2ΔS#).

Further, when the photographing sequence is set to "descending sequence" in the bracket condition, the continuous shooting is performed in accordance with the following expression (4) in order of "+2 correction", "+1 correction", "0: no correction made", "−1 correction", and "−2 correction", that is, in order of (S#+2ΔS#), (S#+ΔS#), (S#), (S#−ΔS#), and (S#−2 ΔS#).

$$S\# = S\#0 + K \times \Delta S\# \quad (4)$$

where K is an arbitrary integer number.

When only the sequence of photographing in the bracket condition is changed to "0+−", the photographing operations are performed in order of (0: no correction made), "+1 correction", "+2 correction", "−1 correction", and "−2 correction", that is, the initial frame is photographed with no correction made, and then the photographing operations are performed in accordance with the above expression (3), and thereafter, in accordance with the above expression (4).

The sequence of photographing is not limited to the above described sequence, but may be set to other sequence for the photographing operations.

With respect to the method of setting the bracket condition, the continuous shooting with the light-emitting position corrected has been described, but the continuous shooting with the light-emitting angle corrected can be performed in a similar manner. For example, when the photographing sequence is set to "ascending sequence", and the initial light-emitting angle is set to "θ" "the total number of frames to be photographed is set to "3", the continuous shooting is performed in accordance with the following expression (5) in order of $(\theta_0-\Delta\theta)$, $(\theta\ 0)$ and $(\theta_0+\Delta\theta)$.

$$\Theta = \Delta\theta_0 - K \times \Delta\theta \tag{5}$$

where K is an arbitrary integer number.

The number of frames to be photographed may be set to an arbitrary number, but the number of frames is preferably set to an odd number such as 1, 3, 5, 7 and so on so as to meet the above correction sequence, that is, the number of frames is preferably set so as to meet n=(2K−1) or in terms of (2K−1).

The number of frames to be photographed is set to the same number of times of light-emitting by the flashlight emitting device 26.

The bracket condition may be set by selecting a predetermined number, or by deleting or adding a number from or to the predetermined number, or may be set by inputting an arbitrary number.

The bracket condition may be set by depressing the operation button 19 in the bracket photograph setting mode, but a separate button which is exclusively used for setting the bracket condition may be provided.

When the bracket condition has been set, a return process is performed to display the mode selection screen again at step S21.

The "photograph mode" is set by operating the mode switching button 4 at step S26, where the photographing condition including the exposure condition is set at step S27. Then, the light measuring process, WB process, zoom process and AF (Automatic focus) process are successively performed at step S28. Thereafter, a through image is displayed on the first display unit 17 together with photograph information including the photographing condition, and setting information at step S29. After confirming these displayed information, the user sets "strobe-light color bracket setting" active at step S30, and sets an initial value of the light-emitting unit 38 on the basis of the previously set WB setting information at step S31. Thereafter, it is confirmed at step S32 whether the main capacitor 43 of the light-emitting member driving unit 39 in the flashlight emitting device 26 has been charged completely. When the main capacitor 43 has not yet been charged completely (NO: step S32), the main capacitor 43 is charged in the manner described above at step S33.

When it is confirmed that the main capacitor 43 has been charged completely (YES: step S32), the user depresses the shutter button 5 at step S34. When the shutter button 5 is depressed, an automatic light-emitting adjusting function makes a part of the light-emitting unit 38 in the flashlight emitting device 26 emit light previously at step S35, and receives light reflected by the object, whereby the light measuring process is performed for light adjustment at step S36, and the bracket conditions set in the "bracket setting mode" are successively set in the light-emitting control unit 53.

The continuous shooting with the light-emitting position corrected will be described, in which the-correction variation is set to "ΔS", the sequence of photographing is "ascending sequence", and the number of frames to be photographed is set to "2k+1".

Figure 14:
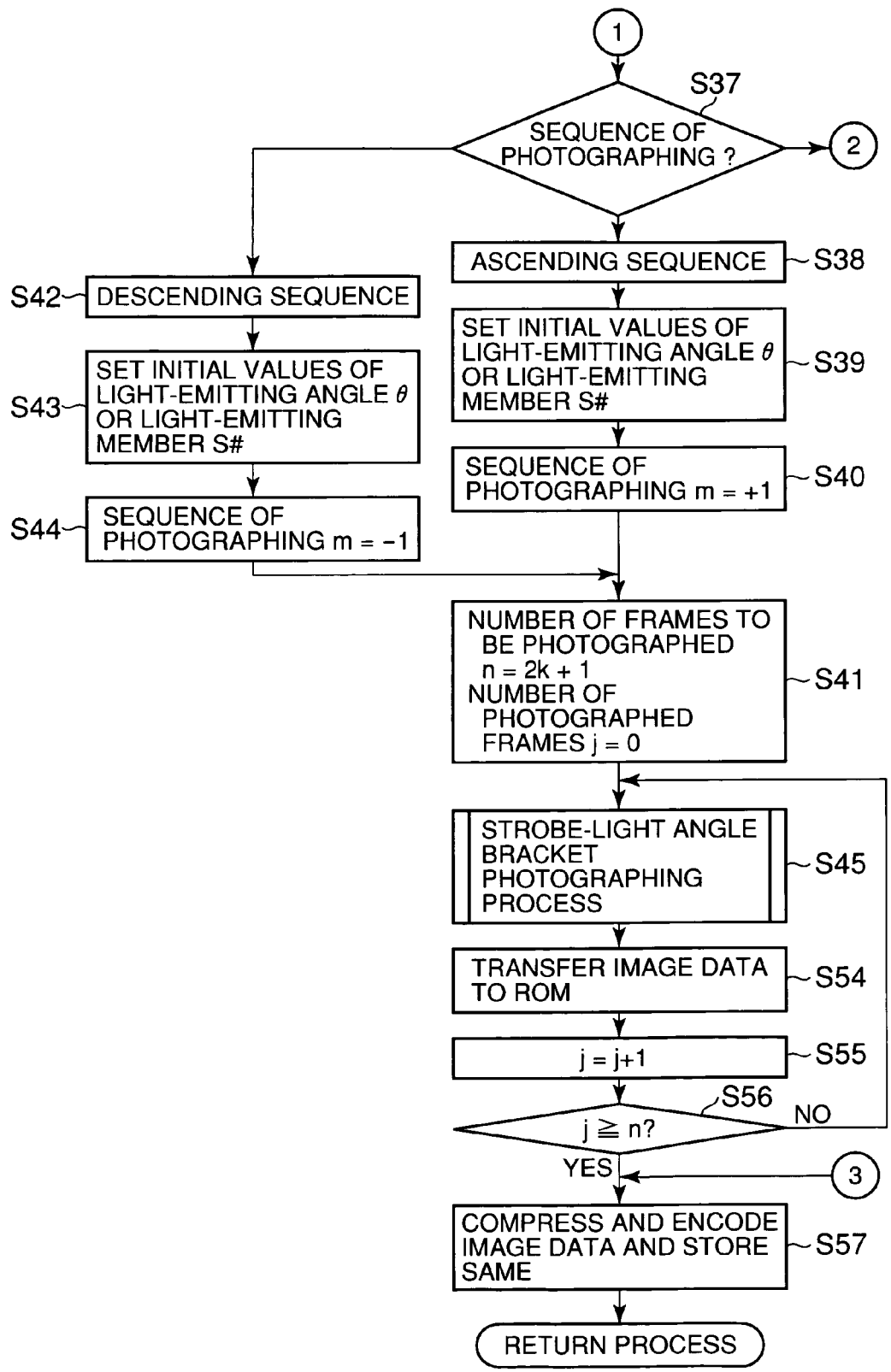
FIG. 14 is a flow chart exemplarily showing processes (2) performed in strobe color-light bracket photography.

It is judged at step S37 in FIG. 14, whether the sequence of photographing is set to "ascending sequence" or to "descending sequence". When it is confirmed at step S38 that the sequence of photographing is set to "ascending sequence", the light-emitting position, or initial value of the number "S#" of the light-emitting member 40 of the light-emitting unit 38 is set at step S39. Further, it is confirmed at step S40 that the sequence of photographing "m" is set to "1", and the number "n" of frames to be photographed and the number of photographed frames are set to "−1" and "0", respectively at step S41. When it is confirmed at step S42 that the sequence of photographing is "descending sequence", the initial value of the number "S#" of the light-emitting member 40 is set at step S43 and the sequence of photographing "n" is set to "−1".

At this moment, the number of photographed frames "j" is set to "0" regardless of the sequence of photographing, since the photographing operation has not yet been executed.

After all the bracket conditions have been set, a correction process for correcting the light-emitting position or the light-emitting angle is executed at step S45. In the correction process for correcting the light-emitting position or the light-emitting angle, the number of "S#" of the light-emitting member 40 is set on the basis of the following expression (6) at step S46 in FIG. 16.

$$S\# = S\# + m \times j \times \Delta S\# \tag{6}$$

Thereafter, it is judged at step S47 whether the main capacitor 43 of the light-emitting member 40 to be made to emit light has been charged completely. When it is confirmed that the main capacitor 43 of the light-emitting member 40 has not yet been charged completely (NO: at step S47), the capacitor 43 is charged at step S48.

In case that the continuous shooting with the light-emitting angle corrected is executed, the light-emitting angle θ is set in accordance with the following expression (7) at step S46, and then it is judged at step S47 whether the main capacitor 43 of the light-emitting member 40 has been charged completely.

$$\theta = \theta + m \times j \times \Delta\theta \tag{7}$$

When it is confirmed that the main capacitor 43 has been charged sufficiently (YES: at step S47), the number of the light-emitting member 40 to be made to emit light is set at step S49, and a light-emitting amount and the exposure condition are adjusted based on the previously set photographing conditions and the measured light amount in the provisional illumination, or GN or an aperture value is adjusted so as to satisfy the following expressions at step S50.

$$GN \geq F \times L/(S/100)^{1/2} \tag{8}$$

where F denotes an aperture value, L denotes a distance to the object, and S represents ISO sensitivity.

$$F \leq [GN \times (S/100)^{1/2}]/L \tag{9}$$

where F denotes an aperture value, and S represents ISO sensitivity.

After the exposure value has been set based on the exposure condition and measured light amount at step S51, the trigger switches 44 operate in response to the trigger signal from the light-emitting control unit 53 to activate the trigger coil 42 of each of the flashlight discharging tubes 40 in the light-emitting unit 38.

Further, electric charge in the trigger capacitor 46 of the trigger coil 42 is discharged through the primary coil of the coil 48 to generate a trigger voltage of about 3300 volts at the secondary coil. The trigger voltage is applied to the flashlight discharging tube 40 of the light-emitting unit 38 to cause arc discharge, whereby arc discharge is caused in the flashlight discharging tube 40, emitting flashlight at step S52. Image data of a photographed image is recorded in RAM of the storing unit 61 at step S53.

The flashlight by arc discharge is automatically ceased by a light-emitting ceasing signal output from a light-emitting cease switching element 45.

Figure 18A:
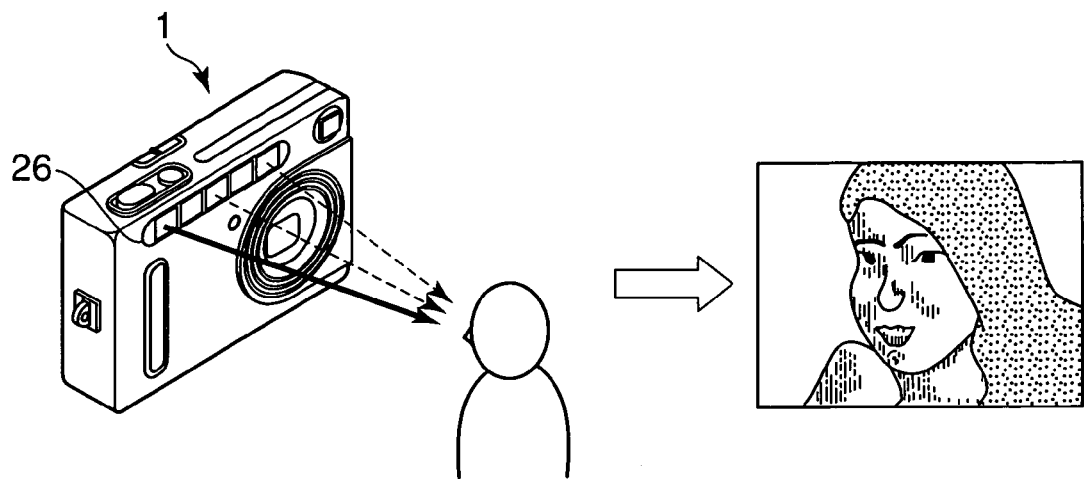
FIGS. 18A to 18C are schematic views illustrating strobe color-light bracket photography.
Figure 18B:
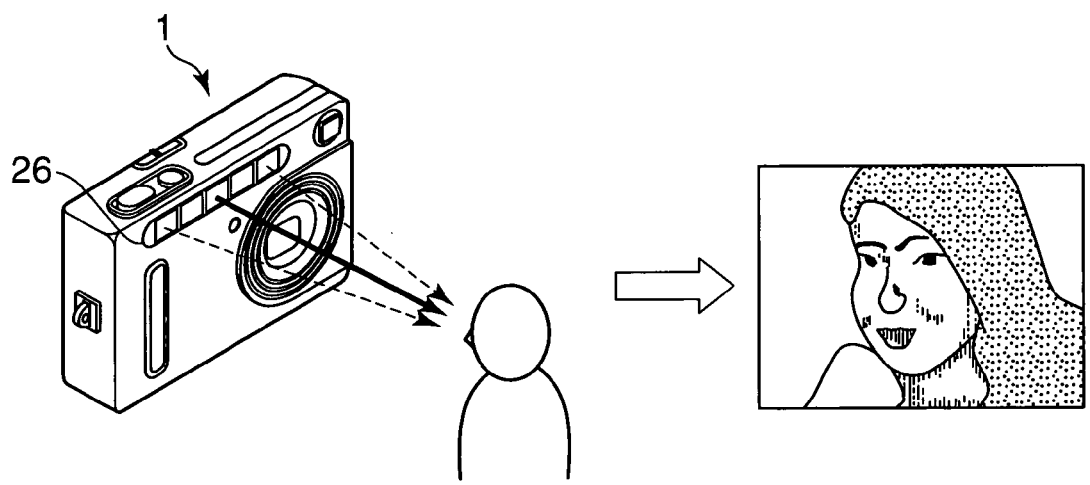
Figure 18C:
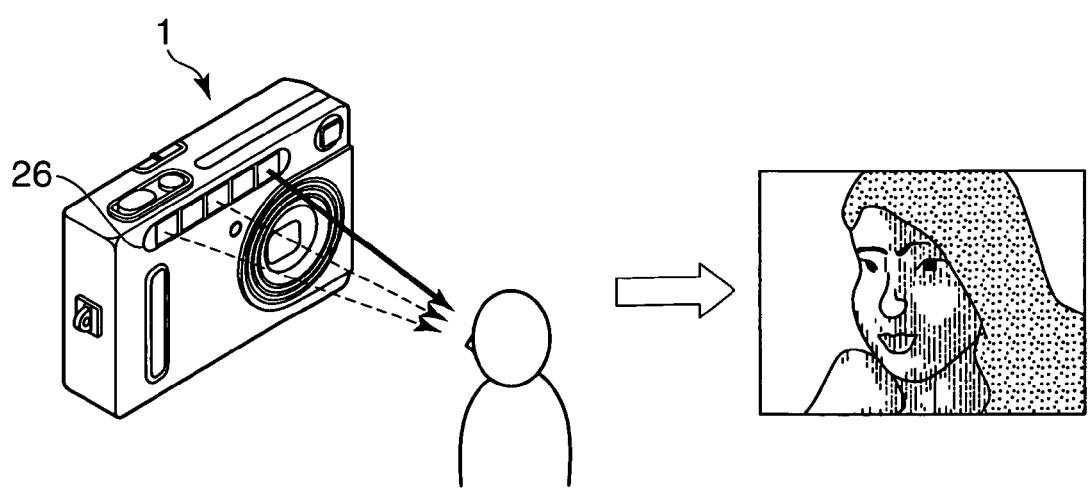

The image data recorded in RAM of the storing unit 61 is transferred to ROM at step S54, and a value of "1" is added to the number of the photographed frames and it is confirmed at step S55 that "j=j+1". Further, it is judged at step S56 whether the number "j" of photographed frames is larger than the number (n) of frames to be photographed or the following expression (10) is true. At this time, since only one frame is photographed, the photographing process is repeatedly performed (NO: at step S56), whereby the light-emitting members 40 emitting light are successively switched to perform the strobe-light color bracket photography, as shown in FIG. 18.

$$j \geq n \tag{10}$$

When the number of photographed frame "j" meets the above condition (YES: at step S56), image data is compressed and encoded by the compression processing unit 63, and finally recorded in the built-in storing unit 61 of the received detachable recording medium 12 together with the exposure condition, light-emitting position or light-emitting angle at step S57. A series of strobe-light color bracket photographing operations have been finished and the return process displays the mode selection screen again at step S21.

The electronic camera 1 of the present invention comprises a light-emitting unit 38 for emitting light, color components of which can be changed, a measuring unit 51 for obtaining color components involved in the light of a light source for illuminating an object or light reflected by the object, an input-image processing unit 52 for determining color components of light to be emitted by the light-emitting unit 38, based on the color components obtained by the measuring unit 51, and a light-emitting member driving unit 39 for making the light-emitting unit 38 emit light including color components decided by the input-image processing unit 52, in response to an instruction given by a user. For various photographing spots, light color, color temperature, or spectral distribution characteristic of flashlight of the electronic camera can be changed, whereby a photographed image of the desired color temperature or spectral distribution characteristic, and a photographed image expressing presentation intended by the user using color illumination are obtained.

In the electronic camera of the invention, the light-emitting unit 38 comprises plural light-emitting members emitting different color lights respectively. Combination of the light-emitting members 40 which simultaneously emit light changes color components of light. Since the light-emitting member driving unit 39 selects one or more light-emitting members and makes same emit light including light components decided by the input-image processing unit 52, continuous shooting with luminescent color corrected can be performed, whereby it is possible to effectively obtain photographed images of the desired color temperature or spectral distribution characteristic, or photographed images expressing intended effects using color illumination, preventing performing photographing operation in error, allowing effective photography, and decreasing burden imposed on the user.

Figure 15:
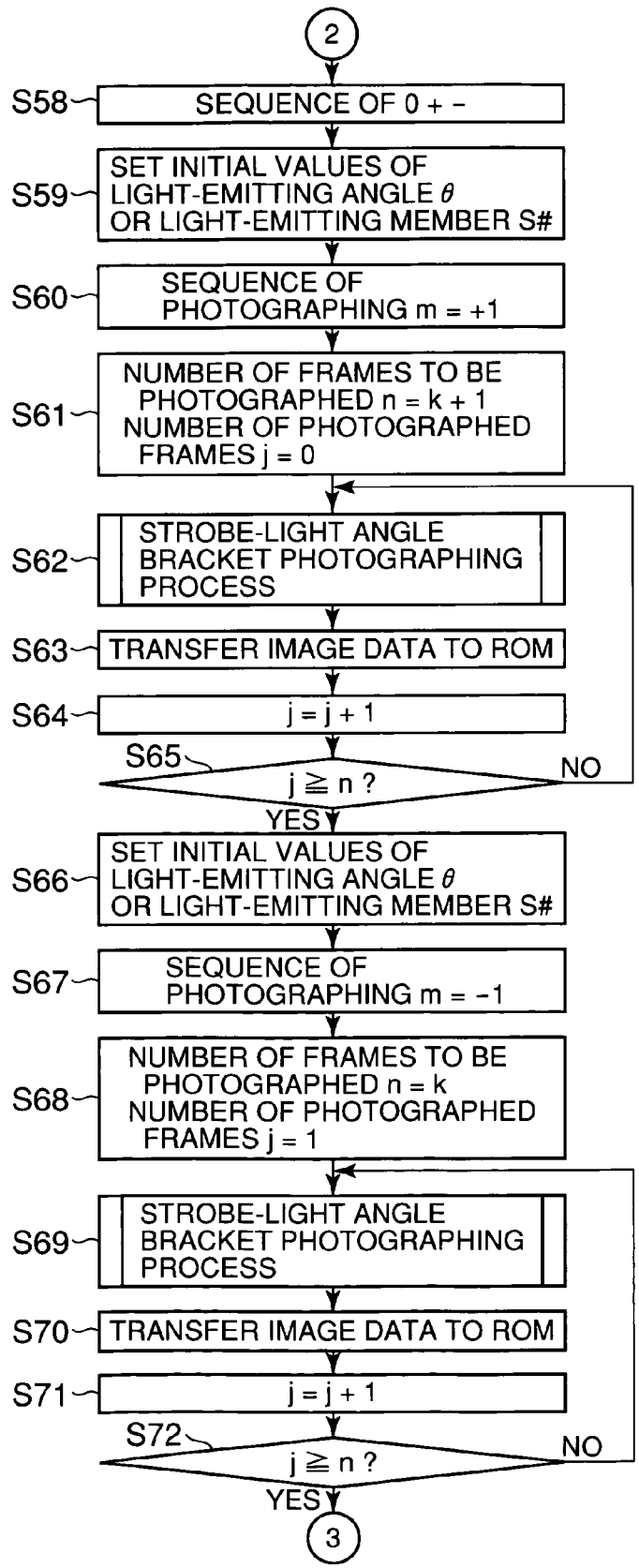
FIG. 15 is a flow chart exemplarily showing processes (3) performed in strobe color-light bracket photography.
Figure 16:
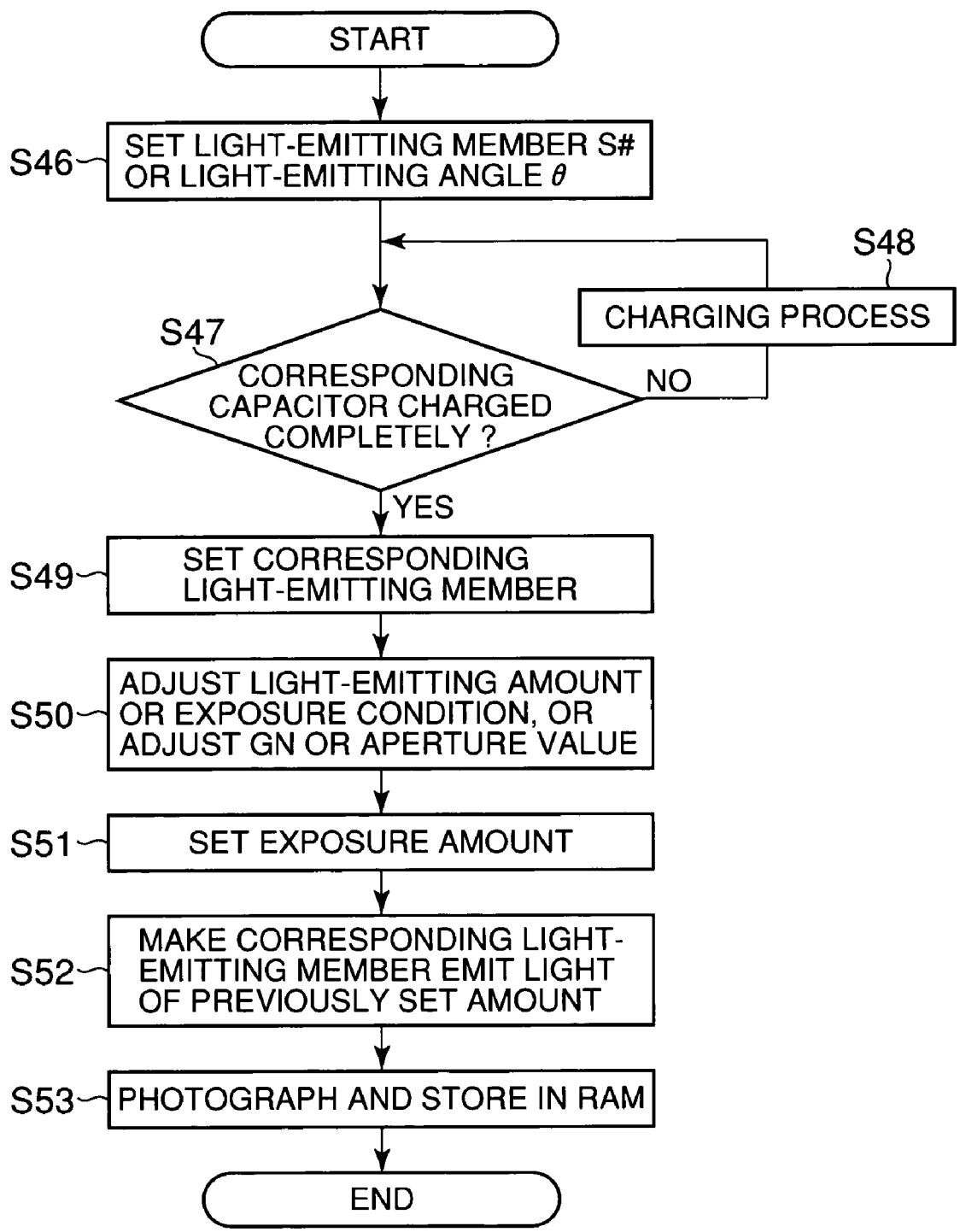
FIG. 16 is a flow chart exemplarily showing processes (4) performed in strobe color-light bracket photography.
Figure 17:
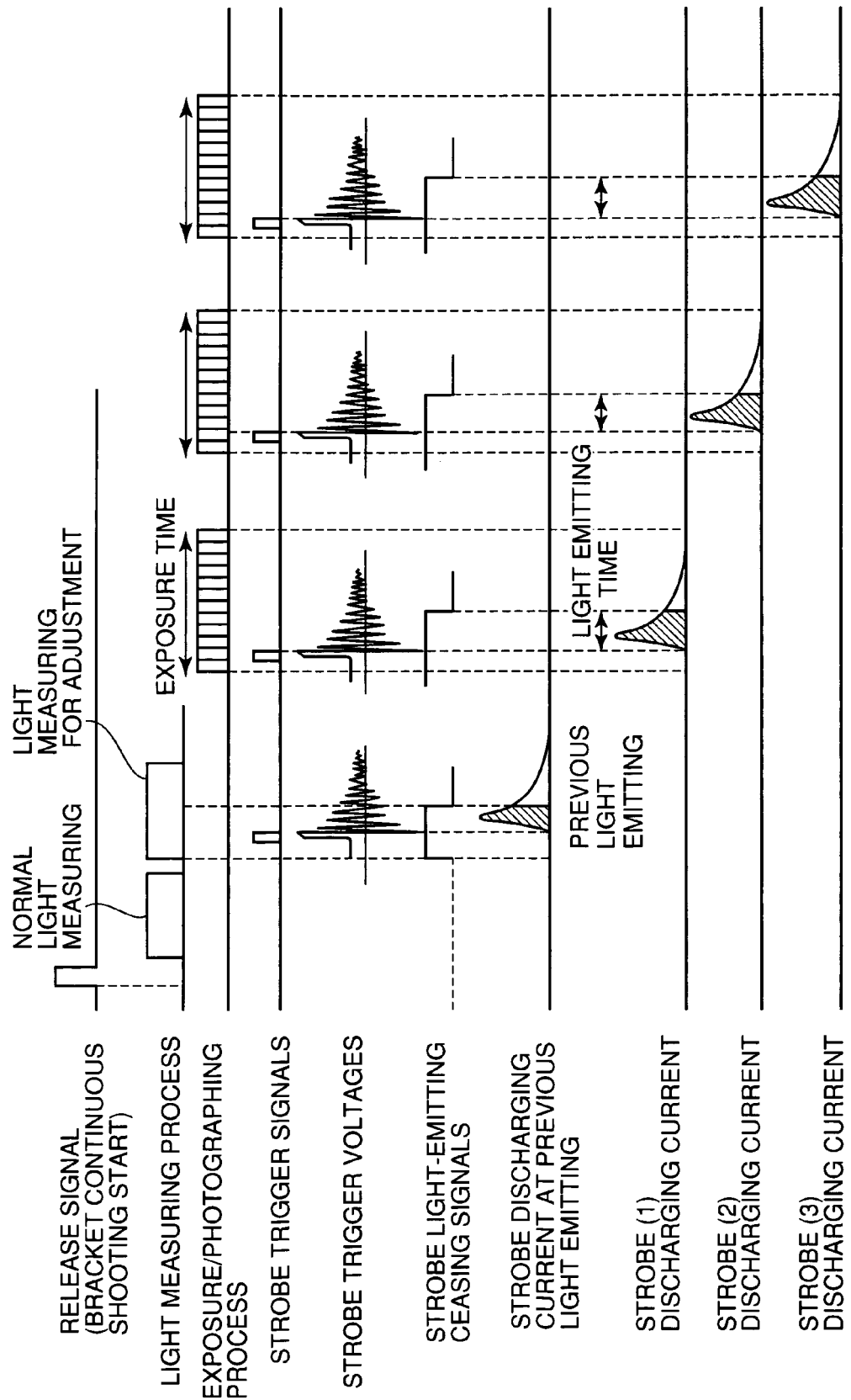
FIG. 17 is a timing chart showing driving operation performed by the flashlight emitting unit using Xenon lamps as light-emitting members.

When the sequence of photographing is set to a sequence other than the ascending or descending sequence, for example, to the sequence of "0+−", the sequence of photographing is confirmed at step S58 in FIG. 15, and an initial value of the light-emitting angle "θ" or light-emitting position "S#", the sequence "m" of photographing are set successively at steps S59, S60, and the number "n" of frames to be photographed and the number "j" of photographed frames are set to "k+1" and "0" respectively in the ascending sequence at step S61.

Strobe-light emitting angle bracket process is performed based on the setting condition at step S62, and when image data is transferred to ROM at step S63, a value of "1" is added to the number "j" of photographed frames, and "j=j+1" is confirmed at step S64. Thereafter it is judged at step S65 whether the number "j" of photographed frames is not less than the number "n" of frames to be photographed.

When it is determined that the number "j" of photographed frames is not less than the number "n" of frames to be photographed, an initial value of the light-emitting angle "θ" or light-emitting position "S#", the sequence "m" of photographing are set successively in the same manner as in the "ascending sequence" at steps S66, S67. At this time, since one frame has been photographed with no correction made, the number "n" of frames to be photographed and the number "j" of photographed frames are set to "k" and "1" respectively at step S68. Strobe-light-emitting angle bracket process is performed under the setting conditions at step S69, and similar processes to those performed in the ascending sequence are repeatedly performed at steps S70, S71, S72. Further following data processing is executed at step S57 in FIG. 14.

[First Modification]

In the present modified embodiment, a detecting unit 35 is provided outside the image pick-up element 30 to detect color temperature information. The present embodiment employs a so-called an external light measuring system, but in not limited to this external system. The modified embodiment can employ an internal light measuring system, which detects color temperature information from difference in color signals separated by the color-component separating circuit 56.

Figure 19:
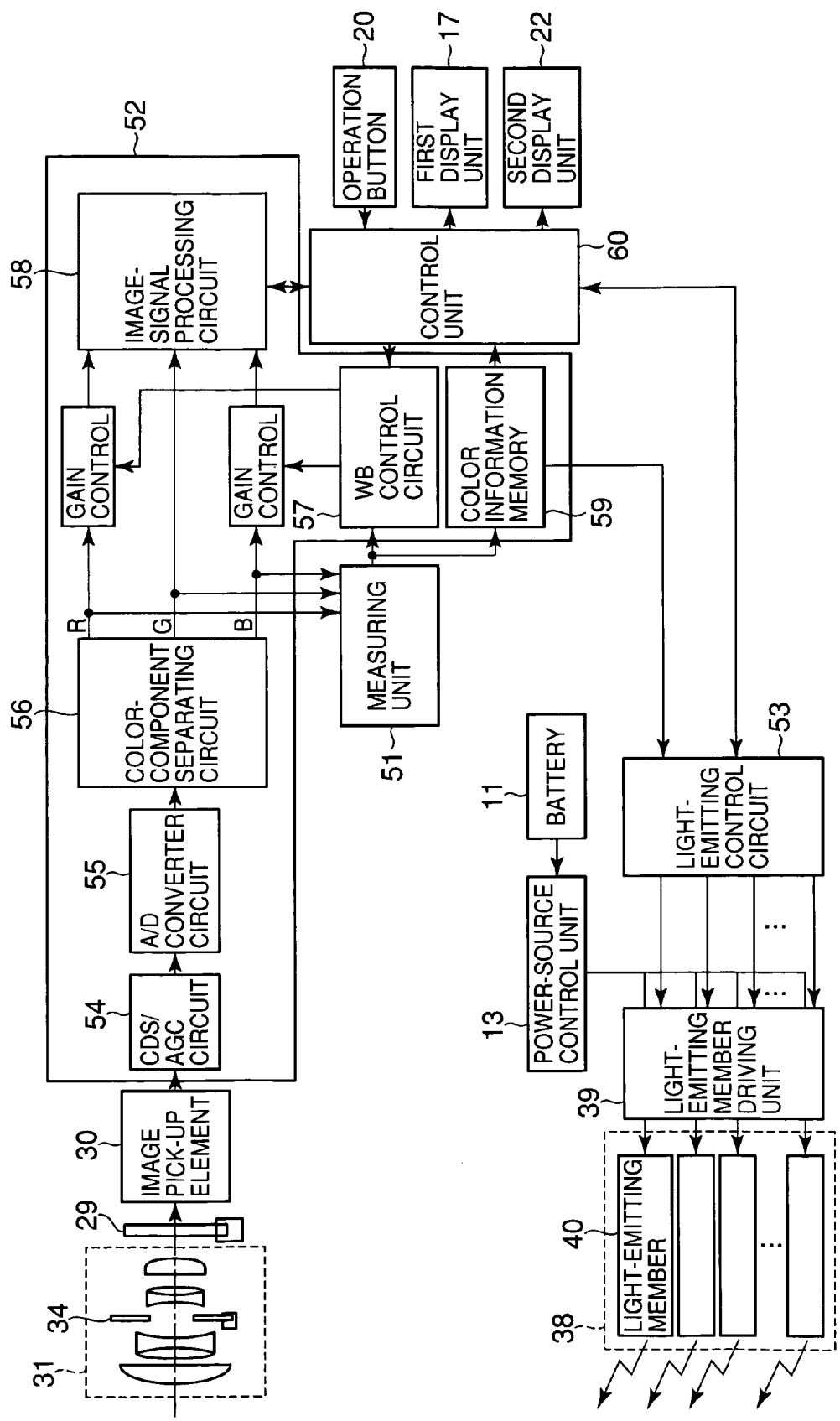
FIG. 19 is a block diagram of a circuit configuration of an electronic camera using an externally measuring system.
Figure 20:
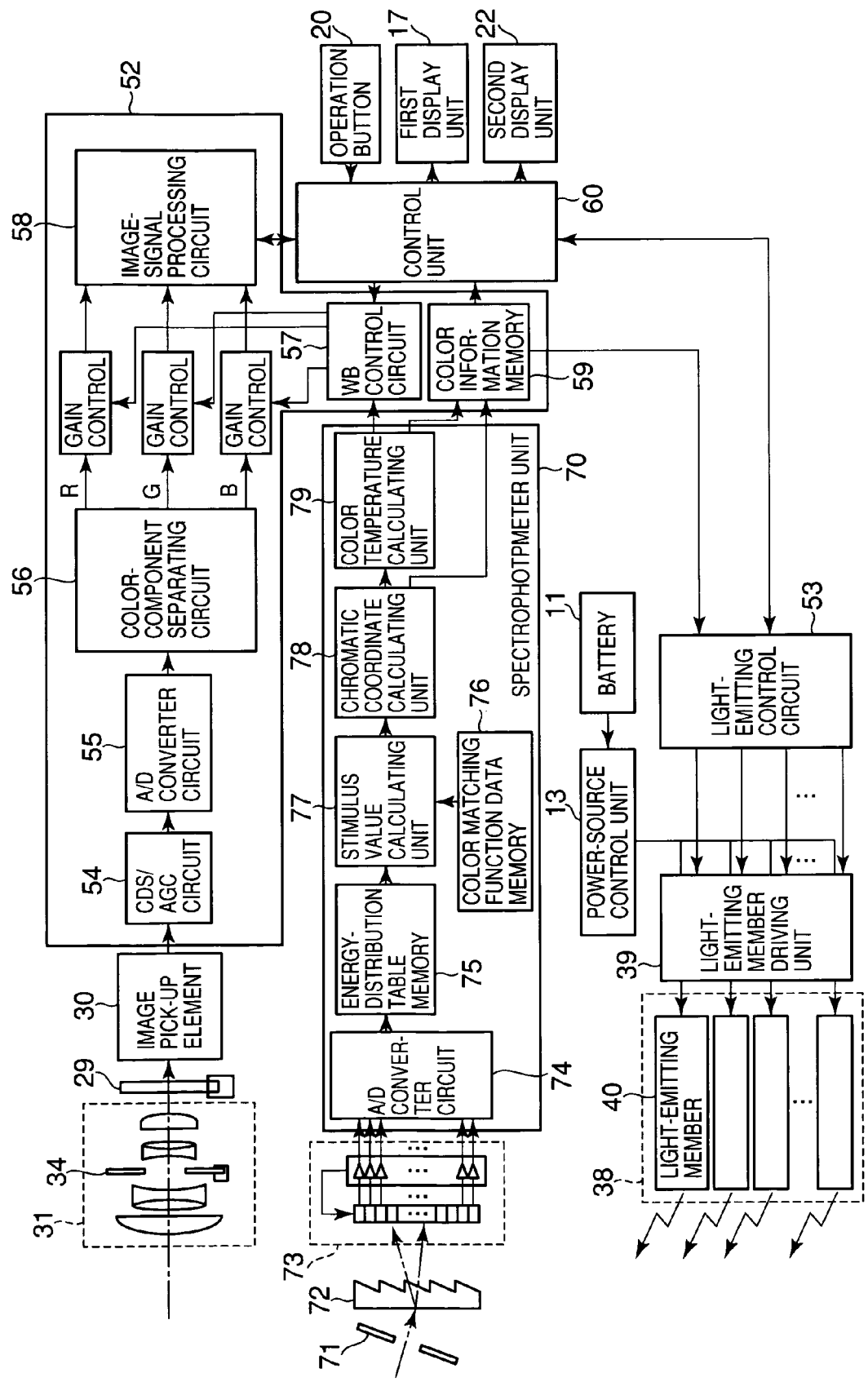
FIG. 20 is a block diagram of a circuit configuration of an electronic camera provided with a spectrophotometer unit.

As shown in FIG. 20, the present modified embodiment can employ a system having a spectrophotometer 70 for precisely measuring a color temperature of light from the light source other than the external or internal light measuring system shown in FIG. 19.

The arrangement having the spectrophotometer 70 is provided with a slit 71, diffraction grating 72, and optical distributing unit 73.

The slit 71 is a plate like member with a fine slit formed therein, into which slit light reflected by the object or light from the light source enters.

The diffraction grating 72 separates light reflected by the object or light from the light source received through the slit 71 into a number of light components each falling in a fine wavelength range.

The optical distributing unit 73 comprises a photo-diode array or a line type photo-sensor, plural light receiving elements of which are integrated with a semi-conductor substrate. The optical distributing unit 73 detects as a spectrum a light energy amounts of the light components each falling in a fine wavelength range.

The spectrophotometer 70 comprises an A/D converter circuit 74, an energy-distribution table memory 75, color matching function data memory 76, stimulus value calculating unit 77, chromatic coordinate calculating unit 78, and color temperature calculating unit 79.

The A/D converter circuit 74 converts a specific energy amount of each wavelength detected by the optical distributing unit 73 into a digital value, and transfers same to the energy-distribution table memory 75.

The energy-distribution table memory 75 stores the specific energy amount of each wavelength digitized by the A/D converter circuit 74 as a spectral-energy distribution data $L(\lambda)$.

An example of the spectral-energy distribution data $L(\lambda)$ is shown in the following table 1.

TABLE 1

| Wavelength λ (nm) | Energy L(λ) |
|---|---|
| 400 | 105.5 |
| 450 | 141 |
| 500 | 136.3 |
| 550 | 110.8 |
| 600 | 105.2 |
| 650 | 95.4 |
| 700 | 74.7 |

The color matching function data memory 76 stores color matching function data such as $r(\lambda)$, $g(\lambda)$, $b(\lambda)$, or $x(\lambda)$, $y(\lambda)$ $z(\lambda)$ each for corresponding wavelengths based on the spectral luminous efficiency characteristic of eyesight.

Examples of color matching function data in RGB color specification system and XYZ color specification system are given in the following tables.

TABLE 2

Color matching function in RGB color specification system

| Wavelength λ (nm) | r (λ) | g (λ) | b (λ) |
|---|---|---|---|
| 400 | 0.003 | −0.0001 | 0.0121 |
| 450 | −0.0121 | 0.0068 | 0.3167 |
| 500 | −0.0717 | 0.0854 | 0.0478 |
| 550 | 0.0228 | 0.2118 | −0.0006 |
| 600 | 0.3443 | 0.0625 | −0.0005 |
| 650 | 0.1017 | 0.0012 | 0.000 |
| 700 | 0.0041 | 0.000 | 0.000 |

TABLE 3

Color matching function in XYZ color specification system

| Wavelength λ (nm) | X (λ) | Y (λ) | Z (λ) |
|---|---|---|---|
| 400 | 0.0143 | 0.0004 | 0.0362 |
| 450 | 0.3362 | 0.038 | 1.7721 |
| 500 | 0.0049 | 0.323 | 0.272 |
| 550 | 0.4334 | 0.995 | 0.008 |
| 600 | 1.0622 | 0.631 | 0.008 |
| 650 | 0.2835 | 0.107 | 0.000 |
| 700 | 0.0114 | 0.0041 | 0.000 |

The stimulus value calculating unit 77 multiplies spectral-energy distribution data $L(\lambda)$ stored in the energy-distribution table memory 75 by color matching function data, and add the products over all wavelength ranges such as the optical wavelength range to calculate tristimulus values of R, G, B or X, Y, Z as indicated by the following equations (11), (12) and (13).

$$R = \sum_i r(\lambda_i)L(\lambda_i) \quad (11)$$

$$G = \sum_i g(\lambda_i)L(\lambda_i) \quad (12)$$

$$B = \sum_i b(\lambda_i)L(\lambda_i) \quad (13)$$

The chromatic coordinate calculating unit 78 converts tristimulus values of R, G, B or X, Y, Z calculated by the stimulus value calculating unit 77 to the chromatic coordinates (r, g, b) or (x, y, z), as indicated by the following equations (14), (15) and (16).

$$r=R/(R+G+B) \quad (14)$$

$$g=G/(R+G+B) \quad (15)$$

$$b=B/(R+G+B) \quad (16)$$

The expression for converting to the chromatic coordinate is not limited to the above expressions (14), (15) and (16). For example, the following expression may be used.

$$b=1-(r+g) \quad (17)$$

The color temperature calculating unit 79 calculates relative color temperatures, using the chromatic coordinates calculated by the chromatic coordinate calculating unit 78 and a conversion table of combination of the chromatic coordinates and color temperatures.

Now, a method of controlling WB using the spectrophotometric measurement will be described in detail with reference to FIG. 21.

Figure 21:
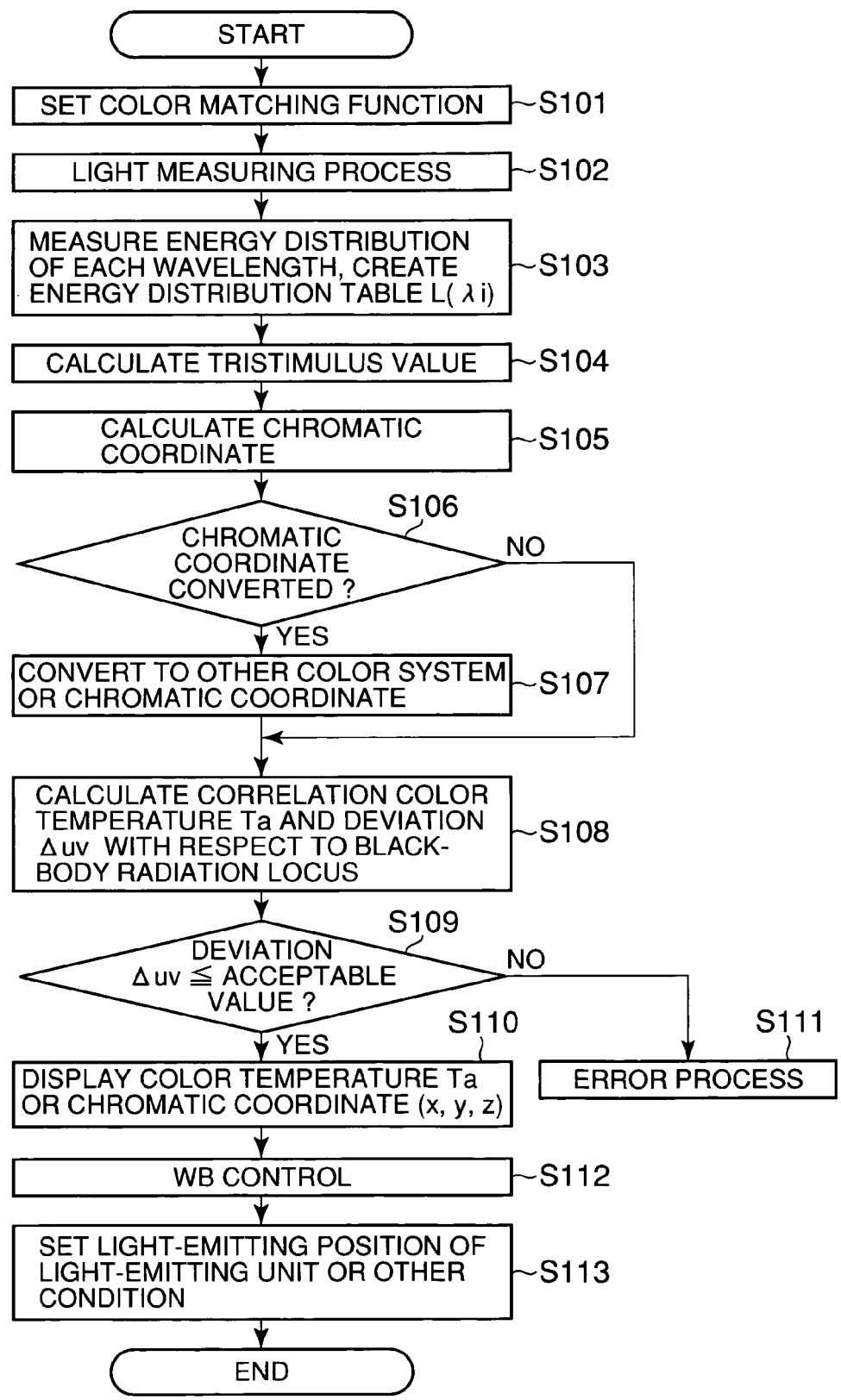
FIG. 21 is a flow chart exemplarily showing a WB control process in a spectrophotometric measurement.

First, a color matching function is set at step S101 in FIG. 21, and the light measuring process is executed at step S102. Thereafter, energy distribution for each wavelength is measured, and an energy distribution table $L(\lambda i)$ is created at step S103. Tristimulus values are calculated at step S104, and chromatic coordinates are calculated using these tristimulus values at step S105.

Then, it is judged at step S106 whether to execute a coordinate conversion process or not. When the coordinate conversion process is executed (YES: at step S106), a coordinate is converted to other color specification system or chromatic coordinate at step S107. For example, RGB coordinate is converted to xyz coordinate, or XYZ coordinate is converted to xyz coordinate. Correlation color temperatures Ta and deviation Δuv with respect to the black-body radiation locus are calculated using the converted chromatic coordinate at step S108. When the coordinate conversion process is not executed (NO: at step S106), correlation color temperatures Ta and deviation Δuv with respect to the black-body radiation locus are calculated using the chromatic coordinate which has not yet been subjected to the coordinate conversion process at step S108.

It is judged at step S109 whether or not the calculated deviation Δuv is not more than the acceptable value. When the deviation Δuv is not more than the acceptable value (YES: at step S109), color temperature Ta or chromatic coordinate (x, y, z) is displayed on the first and second display unit 17, 22 at step S110. When the deviation Δuv is more than the acceptable value (NO: at step S109), an error process of color temperature measurement is performed at step S111.

Finally, WB control circuit 57 of the input-image processing unit 52 adjusts WB based on the calculated color temperature Ta or chromatic coordinate at step S112. Further, the light-emitting position of the light-emitting unit 38 and other conditions are set on the basis of color temperature and WB setting information at step S113, finishing a series of WB control processes.

The electronic camera of the present invention calculates chromatic coordinate such as (r, g, b) or (x, y, z), using tristimulus values RGB or XYZ, and can calculate correlation color temperature from the chromatic coordinate and the conversion table of combination of chromatic coordinate and color temperature, whereby WB can precisely be adjusted based on color temperature.

Figure 22:
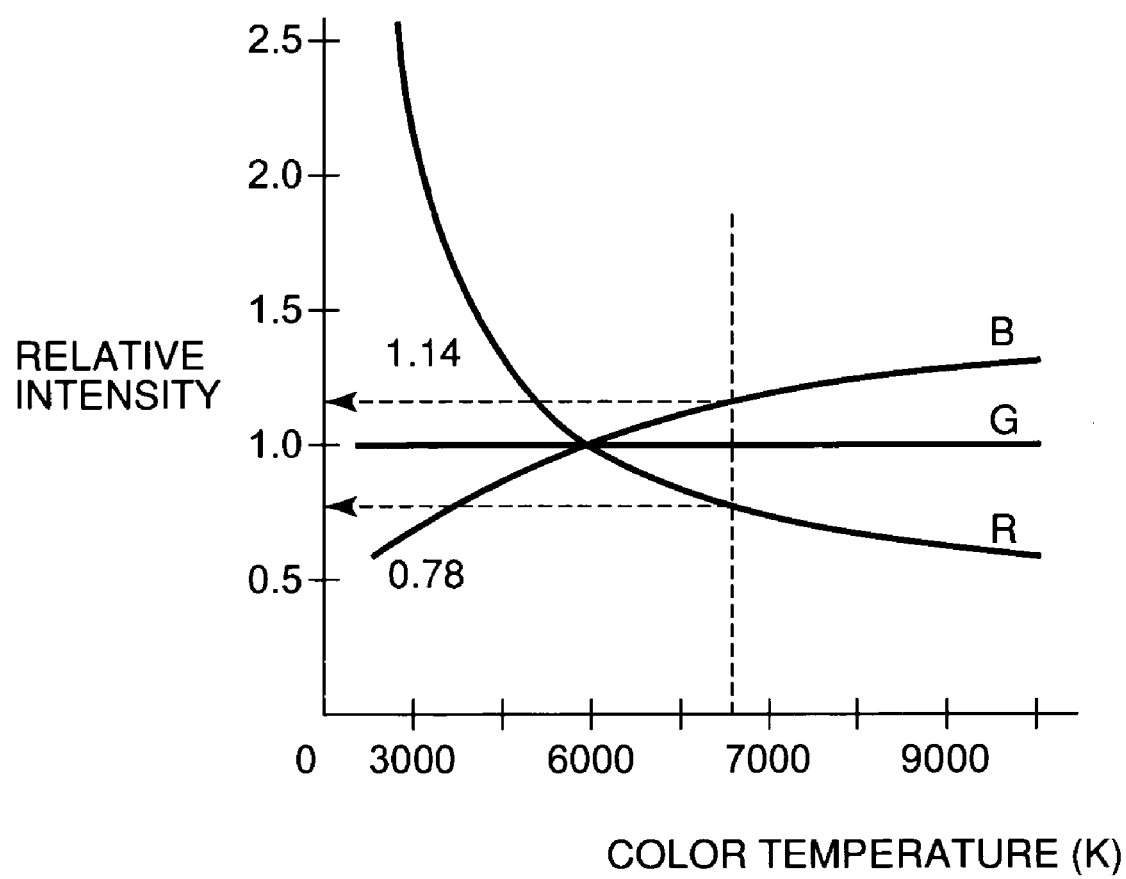
FIG. 22 is a graph exemplarily showing a relationship between a color temperature and relative intensity of a flash-light discharging lamp.
Figure 23:
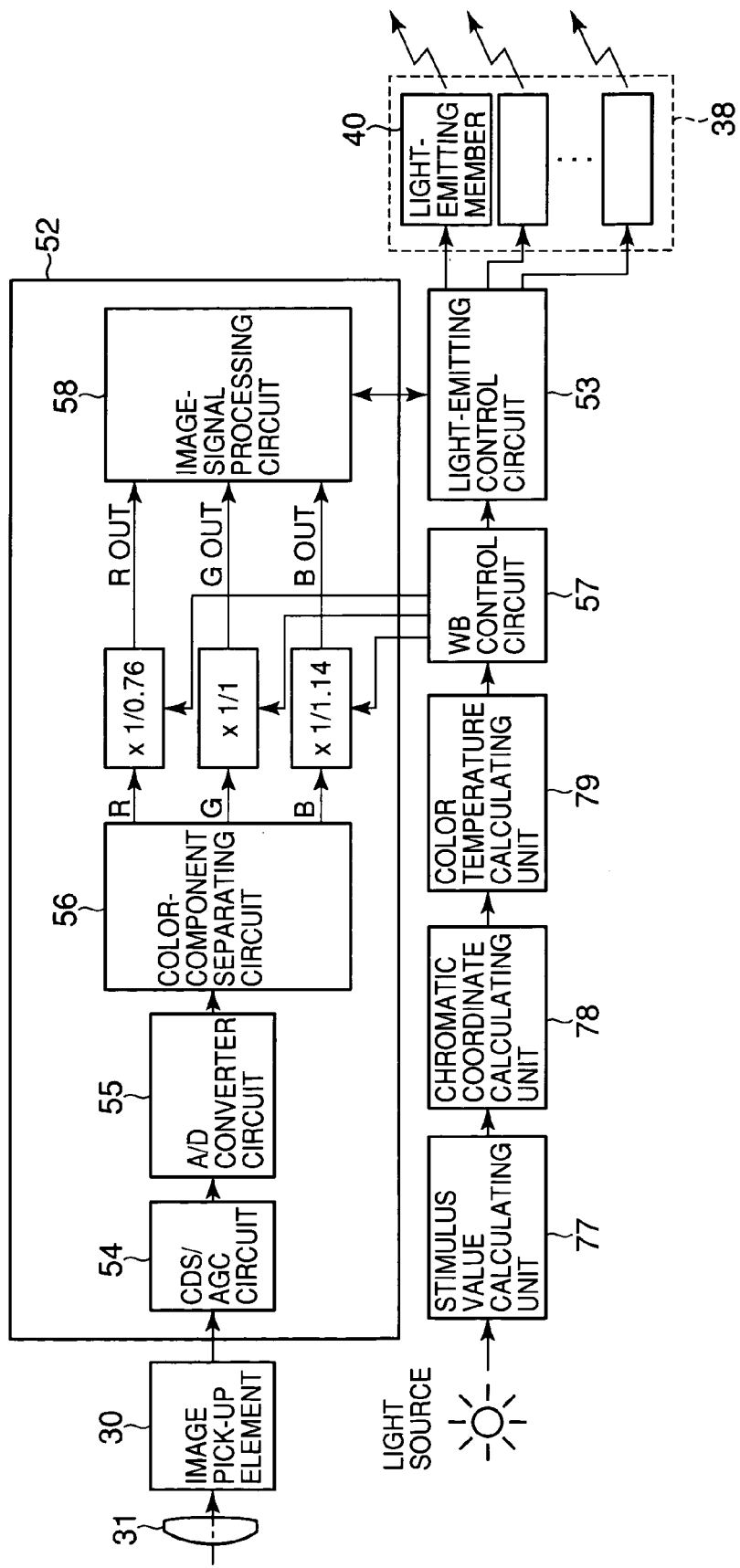
FIG. 23 is a schematic view exemplarily showing WB control for the spectrophotometric measurement.

Gain control method of color components of an image signal or WB control method based on difference between color signals, color component ration, or color temperature information is not restricted to those described above. The gain control method of color components of an image signal or WB control method may be executed based on gain control volumes of R, G, B color signal corresponding to color temperatures calculated from the inverse number of the relative intensity of R, G, B signal, as shown in FIG. 23, with reference to character data of color temperature of black-body radiation and relative intensity of R, G, B color signal, or the conversion table shown in FIG. 22.

Further, the gain control method of color components of an image signal or WB control method may be executed based on spectral distribution characteristic of an imaginary filter $F(\lambda i)$ calculate by the following expression (18). This color conversion filter $F(\lambda i)$ is calculated by the expression (18) and capable of converting the above chromatic distribution characteristic data $L(\lambda i)$ of the light source to the desired chromatic distribution characteristic $WL(\lambda i)$ of the standard light source or to the desired chromatic distribution characteristic $WL(\lambda i)$ such as the chromatic characteristic or a flat chromatic distribution characteristic of the black-body radiation at a certain color temperature.

$$F(\lambda i) = LW(\lambda i)/L(\lambda i) \tag{18}$$

The above chromatic distribution characteristic of the black-body radiation at a certain color temperature is calculated by Planck's black-body radiation expression (19) shown below.

$$e(\lambda, T) = 8\pi hc \cdot \lambda^{-5} \cdot \{\exp(hc/\lambda kT) - 1\}^{-1} \tag{19}$$

where "h" denotes Planck constant, "c" velocity of light, and "K" Bolzmann constant.

The chromatic distribution characteristic of the black-body radiation at a certain color temperature may be calculated as follows: The intensity of a peak wavelength of each characteristic or a radiation energy intensity of the light source at a certain color temperature, for example, at 3200K or 5000K is set as the standard value, and intensities relative to the standard value are previously recorded in a table or a function. The chromatic distribution characteristic of the black-body radiation is calculated with reference to the table or the function.

[Second Modification]

Figure 24:
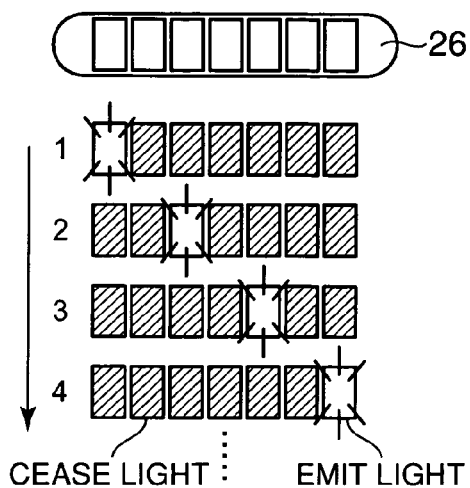
FIG. 24 is a schematic view illustrating a light-emitting pattern of a light-emitting unit.
Figure 25:
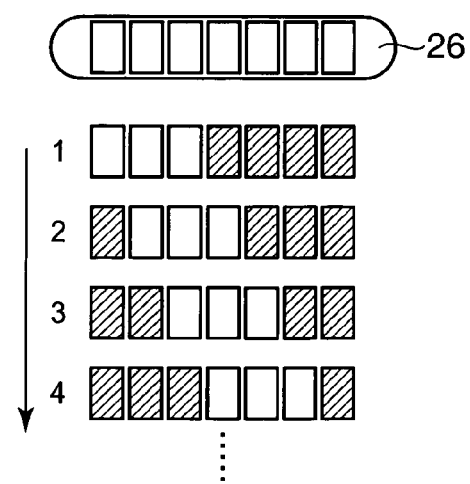
FIG. 25 is a schematic view illustrating another light-emitting pattern of the light-emitting unit.

In the present second modification, plural light-emitting members 40 of the flashlight emitting device 26 are separately switched to emit light as illustrated in FIG. 24, whereby the light-emitting position or the light-emitting angle is changed during the strobe-light angle bracket photography. The strobe-light angle bracket photography is not limited to the above arrangement, but some number of the light-emitting members 40 of the flashlight emitting device 26 may selectively be switched to emit light as illustrated in FIG. 25.

Figure 26:
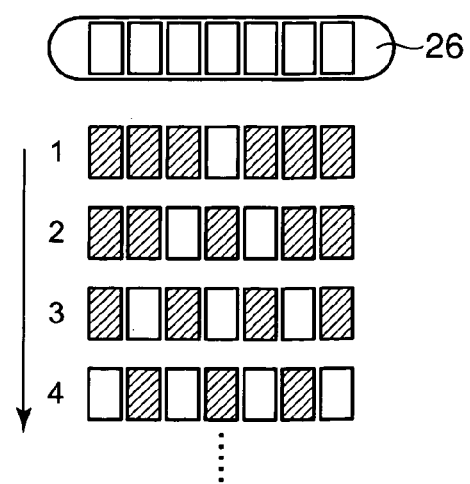
FIG. 26 is a schematic view illustrating still another light-emitting pattern of the light-emitting unit.
Figure 27:
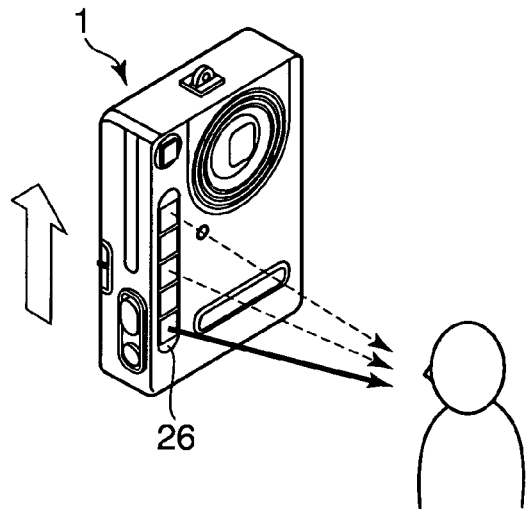
FIG. 27 is a schematic view illustrating the electronic camera used to photograph a person, which is turned by 90 degrees from the normal use position.

Meanwhile, the number and positions of the light-emitting members 40 which emit light may be changed or switched for the strobe-light angle bracket photography, as illustrated in FIG. 26.

As described above, one release operation by the user can correct the light-emitting angle as well as light-emitting amount of the flashlight emitting device 26, whereby it is possible to increase opportunities to obtain image of desired light volume and shadow under the desired light-emitting angle of the light source and shadow condition.

Third Embodiment

The light-emitting members 40 of the light-emitting unit 38 disposed in the horizontal direction emit light, whereby the strobe-light angle bracket photographing operation is performed with side illumination. In the present third modification, the strobe-light angle bracket photographing operation may be performed under illumination in the vertical direction by turning the camera by 90 degrees, that is, the strobe-light angle bracket photographing operation may be performed under illumination of ascending or descending vertical angles.

Figure 28:
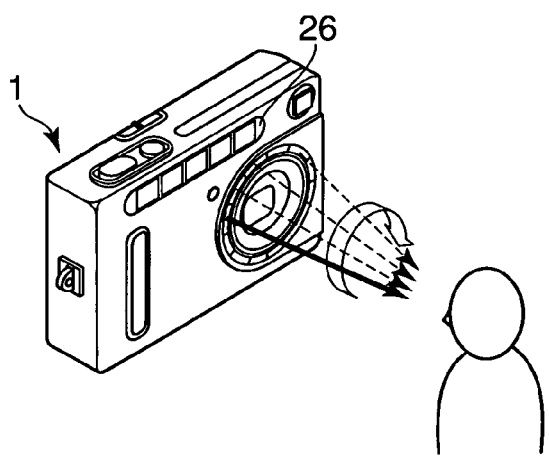
FIG. 28 is a schematic view illustrating the electronic camera used, which is provided with a flashlight emitting unit having other arrangement.

The flashlight emitting device 26 may be comprised of plural light-emitting members 40 which are disposed in a line along the circumference of the image pick-up lens 31 on the front surface of the housing 2, as shown in FIG. 28.

Figure 29:
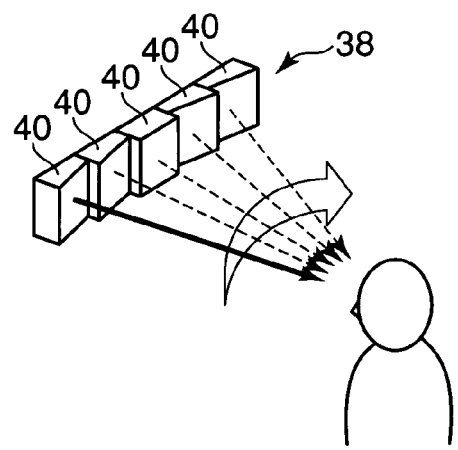
FIG. 29 is a schematic view showing another arrangement of the light-emitting unit.

Further, modification may be made such that the illumination angle may be switched to a desired direction by selecting an arbitrary light emitting member among those previously arranged so as to face different directions respectively to show different light-emitting angles, as illustrated in FIG. 29.

The light-emitting member 40 in the light-emitting unit 38 may be adapted to be rotated by a driving device such as a motor, such that the installation angle of the light-emitting member 40 is turned to adjust the inclination angle of the member 40, whereby the light-emitting angle may be corrected precisely.

[Fourth Modification]

Figure 30:
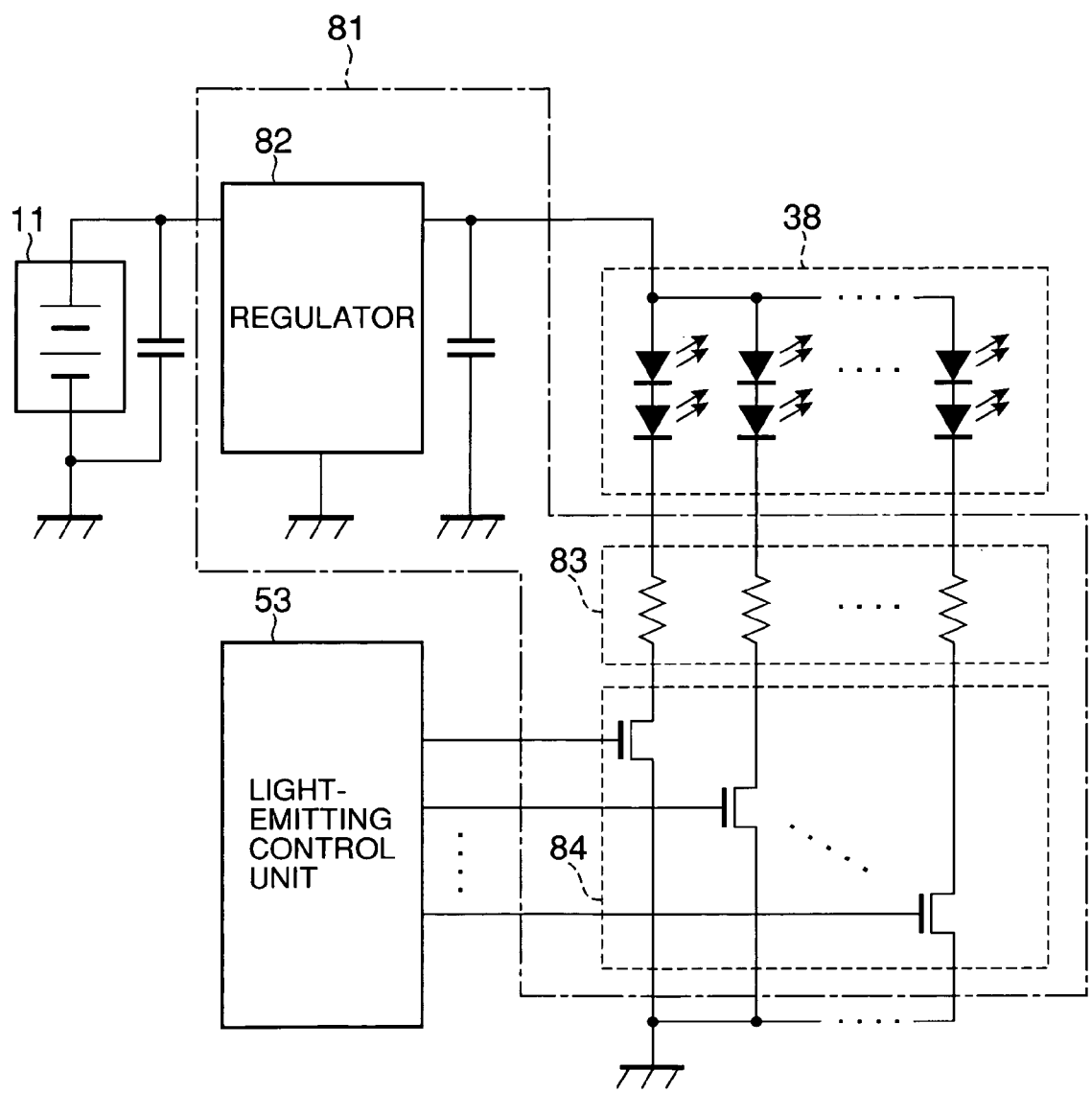
FIG. 30 is a block diagram illustrating a circuit configuration of a flashlight emitting unit using LEDs as light-emitting members.

In the embodiment of the electronic camera of the invention, a flashlight discharging tube such as Xenon lamp is used as the light-emitting member 40 in the flashlight emitting device 26. A white LED may also be used as the light-emitting member 40. A circuit configuration of the light-emitting member driving unit for driving the light-emitting member 40 such as LED is different from that for driving the light-emitting member 40 such as Xenon lamp. The circuit configuration of the light-emitting member driving unit for driving LED is different from that for driving Xenon lamp, and will be described in detail with reference to FIG. 30 to FIG. 32. The same configuration as that described in the above embodiments will not be described, again.

A light-emitting member driving unit 81 for driving LEDs used as the light-emitting members 40 in the light-emitting unit 38 is provided with a regulator 82 including DC/DC converter and charge pump, restriction resisters 83, and a light-emitting control unit 53 in place of the booster charging circuit 41, and trigger coils 42.

The main capacitors 43 are not provided for each light-emitting member 40 but one main capacitor 43 is provided in the light-emitting member driving unit 81. In the light-emitting member driving unit 81 having the above arrangement for driving LEDs, a voltage is raised to several or several tens volts by the regulator 72, and the raised voltage is directly applied to each light-emitting member 40 to make same emit light without charging operation for each light-emitting member.

Figure 31:
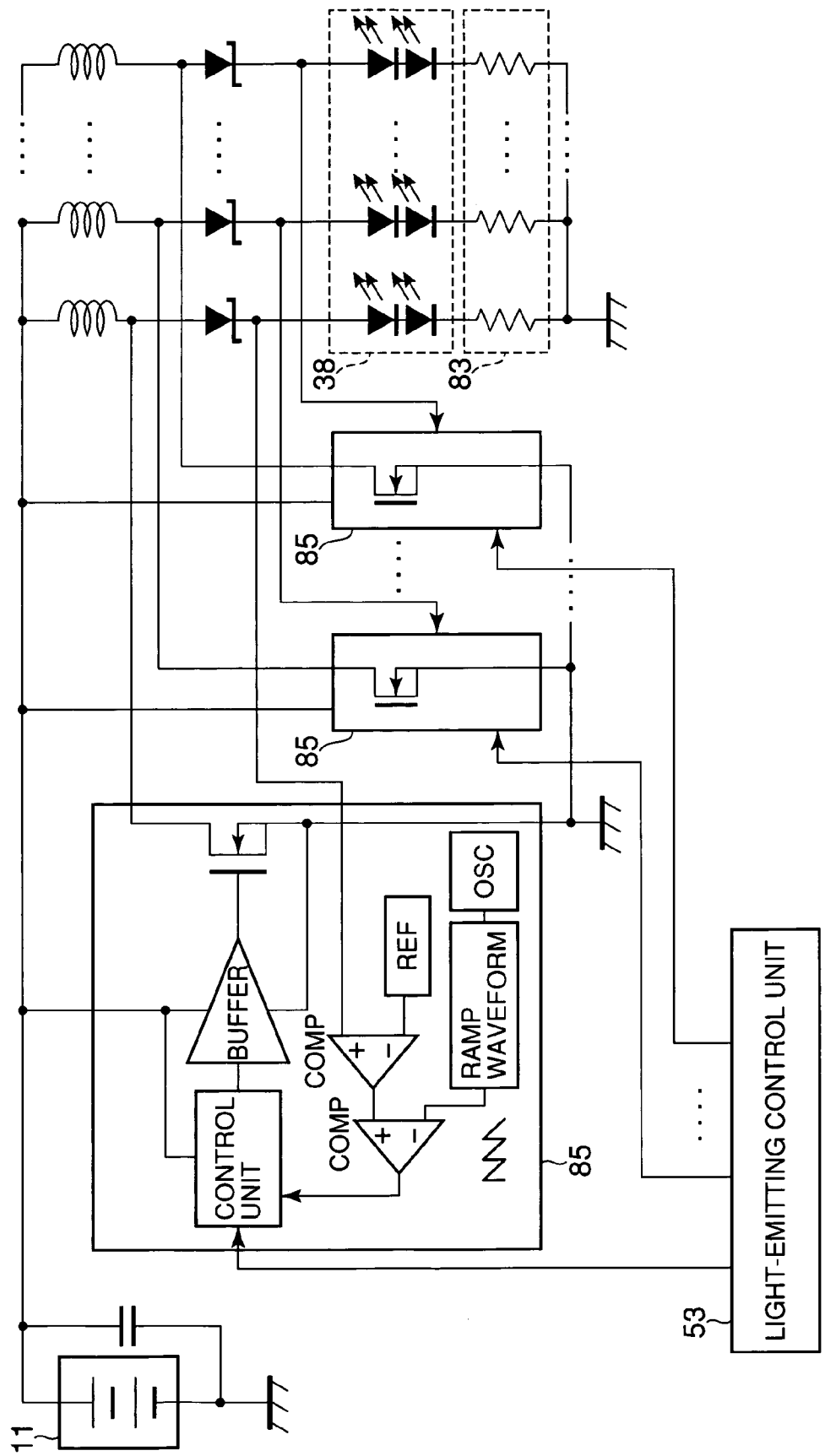
FIG. 31 is a block diagram illustrating another circuit configuration of the flashlight emitting unit using LEDs as light-emitting members.
Figure 32:
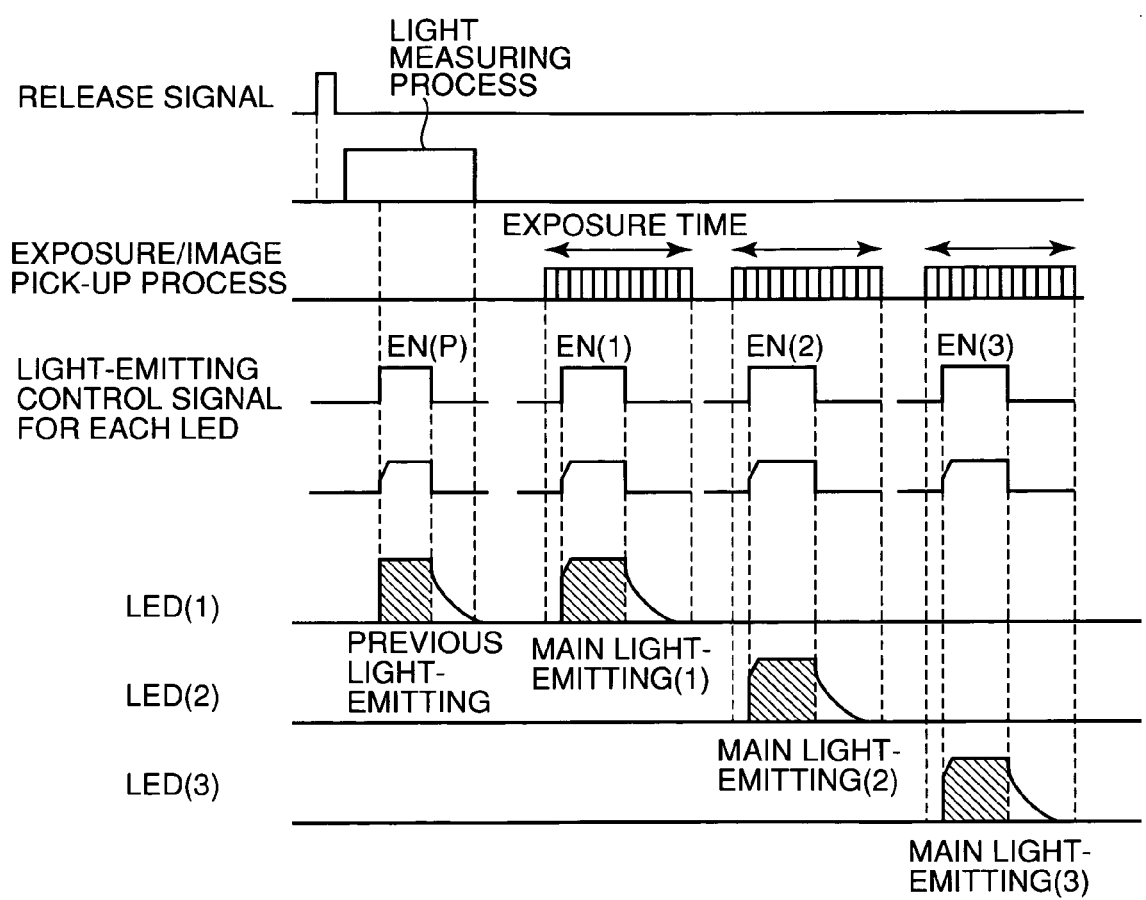
FIG. 32 is a timing chart showing driving operation performed by the flashlight emitting unit using LEDs as light-emitting members.

As shown in FIG. 31, the light-emitting member driving unit 81 for driving LEDs may be provided with a combination of a regulator and driving circuit. The light-emitting member driving unit 81 of this arrangement emits light in a pulse wave manner having a certain pulse width, as shown in FIG. 32.

As described above, when the white LEDs are used as the light-emitting members 40 in the flashlight emitting device 26, there is no need to raise the voltage to several thousands volts, but a voltage of several or several tens volts is sufficient to make LED emit light. Therefore, no trigger coil 42 is needed. Further, the light emitting member 40 can directly be made to emit light by a voltage raised by the regulator 82, whereby the circuit configuration is made simple and finally the device can be made compact in dimension.

LED used as the light-emitting member is not limited to white LED, but, for example, three LEDs such as red (R), green (G), and blue (B) LED may be used.

In the flashlight emitting device 26, single-color lights emitted respectively by three LEDs are subjected to additive color mixture, whereby relative intensities of luminescent colors are adjusted for performing the strobe-light bracket photographing operation with light-emitting angle corrected or the strobe-light bracket photographing operation with light-emitting angle and luminescent color corrected.

Figure 34:
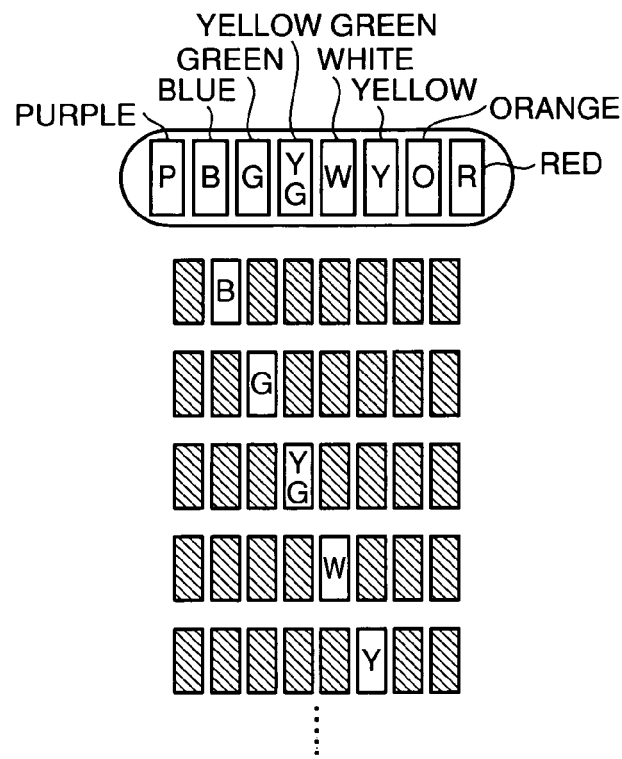
FIG. 34 is a schematic view illustrating a light-emitting pattern of a light-emitting unit employing LEDs.
Figure 35:
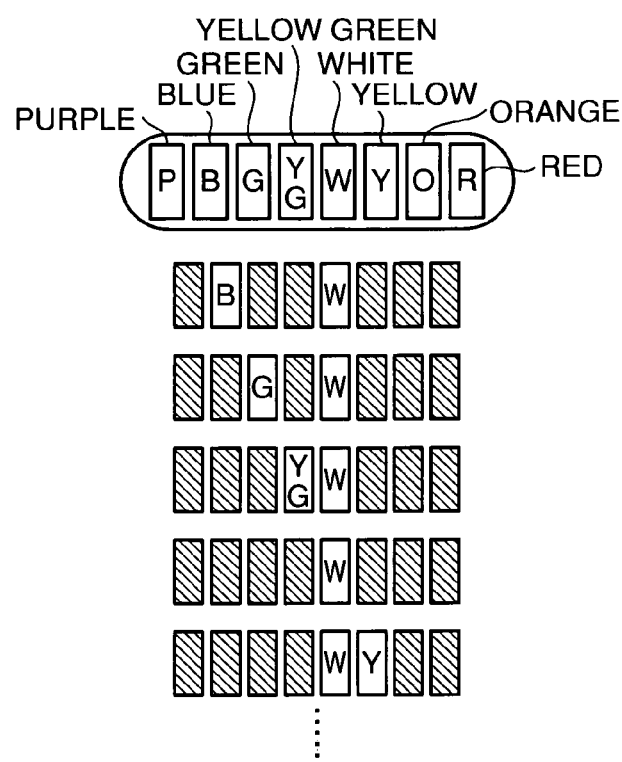
FIG. 35 is a schematic view illustrating another light-emitting pattern of a light-emitting unit employing LEDs.

In addition to the red (R), green (G), blue (B) LED, a purple (P), yellow green (YG), yellow (Y) orange (O) LED may be used as the light-emitting members in the flashlight emitting device 26, as shown in FIG. 34.

Figure 33:
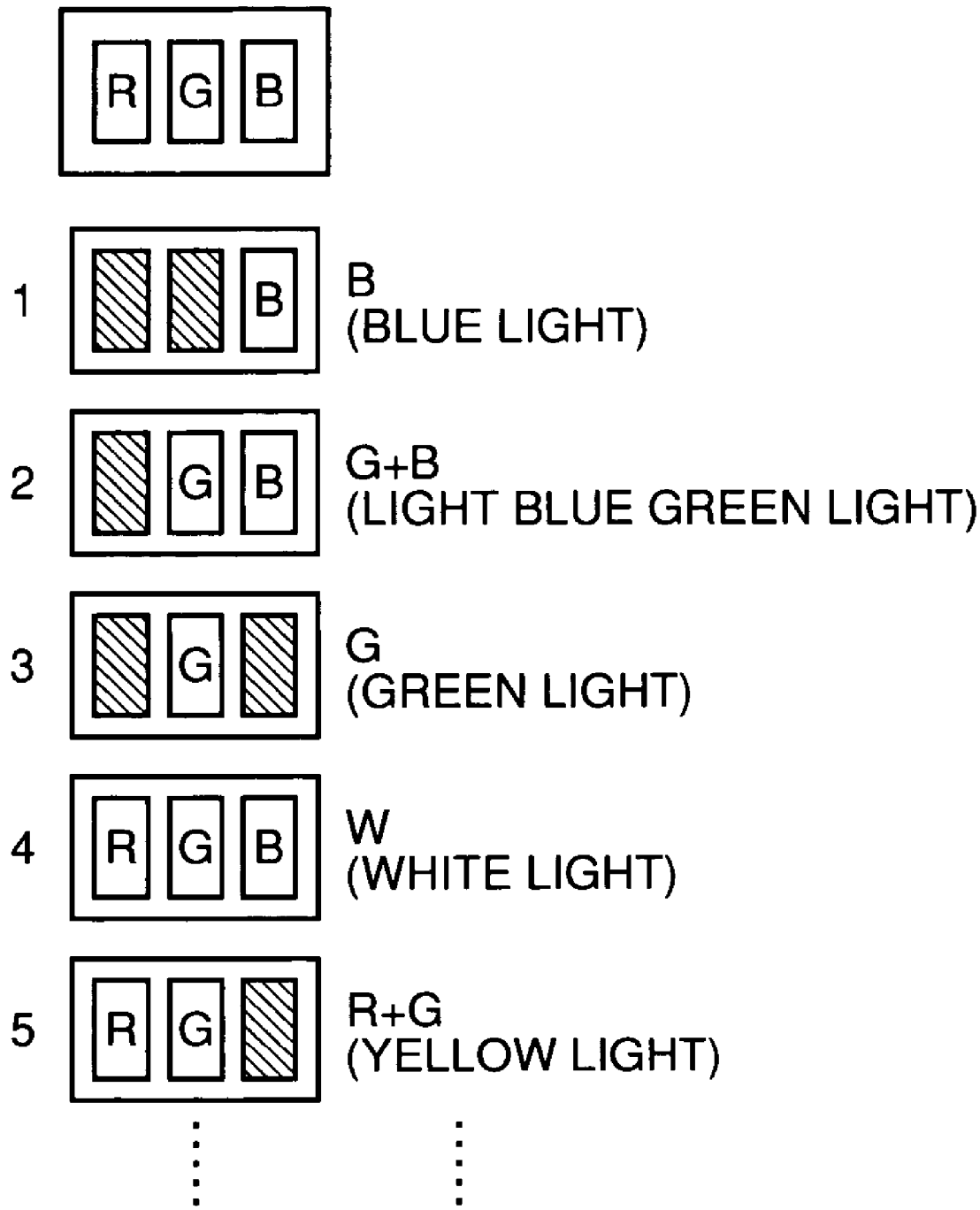
FIG. 33 is a schematic view illustrating a light-emitting pattern of a light-emitting unit employing red, green and blue LEDs in combination.

In the flashlight emitting device 26 having the above arrangement, color lights emitted by the respective color LEDs are subjected to additive color mixture in response to selection of light-emitting members to correct the luminescent color, whereby photographing operation is performed with light-emitting angle and luminescent color corrected in the similar manner to as shown in FIG. 33.

The flashlight emitting device 26 may be modified such that LED emitting white light is made to emit white light used as the fundamental light at all times, and other LEDs are successively turned on to emit other color light.

In case that the spectral distribution characteristic is biased or that relative light-emitting intensity of some wavelength range is low, the flashlight emitting device 26 of the above arrangement is used to equalize the spectral distribution characteristic. That is, LED which emits light falling in wavelength range whose light intensity is low relative to white light is made to emit light to equalize the spectral distribution characteristic. Color temperature and WB may also be corrected in the similar manner.

Further, a blue LED combined with a yellow fluorescent material may be used for the flashlight emitting device to generate white light in a pseudo manner. As another arrangement, an ultraviolet light LED combined with red, green, blue fluorescent material or with orange, yellow, green, blue fluorescent material may be used for the flashlight emitting device to generate white light in a pseudo manner.

Figure 36:
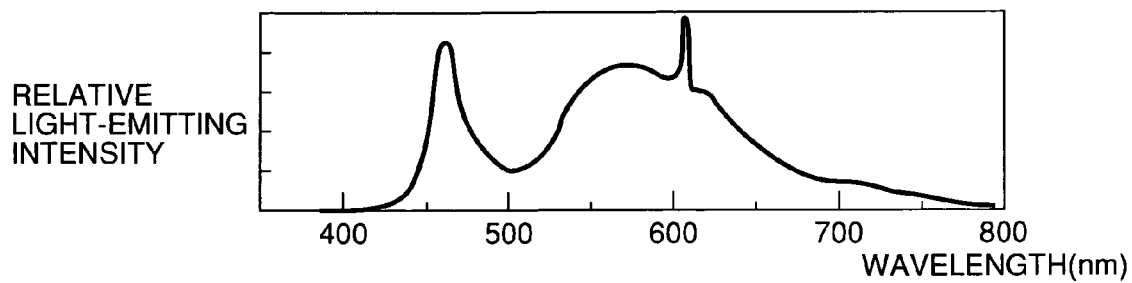
FIG. 36 is a spectrum chart illustrating relative light-emitting intensity distribution of light emitted from combination of blue LED and yellow fluorescent material.
Figure 37:
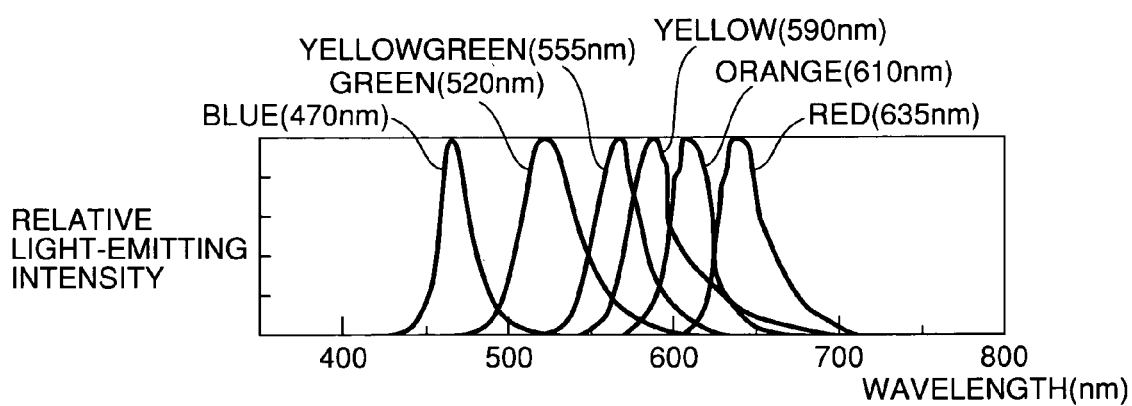
FIG. 37 is a spectrum chart illustrating relative light-emitting intensity distributions of light emitted from respective color LEDs.

In the flashlight emitting device 26 using the combination of blue LED and yellow fluorescent material, since the relative light-emitting intensity is low at wavelength ranges corresponding to blue and green light as shown in FIG. 36, it is necessary to make blue and green LED emit light to equalize the relative light-emitting intensity all over the wavelength range as shown in FIG. 37.

Figure 38:
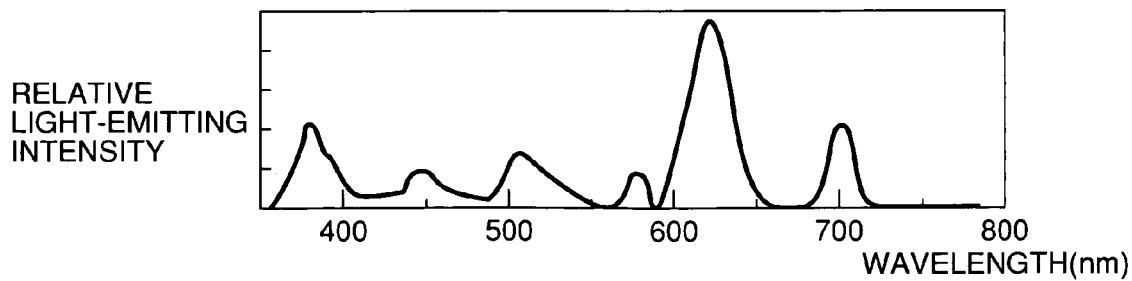
FIG. 38 is a spectrum chart illustrating relative light-emitting intensity distribution of light emitted from combination of ultraviolet LED and red, green, and blue LED.

Meanwhile, in the flashlight emitting device 26 using the ultraviolet light LED combined with red, green, blue fluorescent material, since the relative light-emitting intensity is low at wavelength ranges corresponding to yellow green (YG), yellow (Y) and orange (O) light as shown in FIG. 38, it is necessary to make yellow green, yellow, and orange LED emit light to equalize the relative light-emitting intensity all over the wavelength range as shown in FIG. 37.

Figure 39:
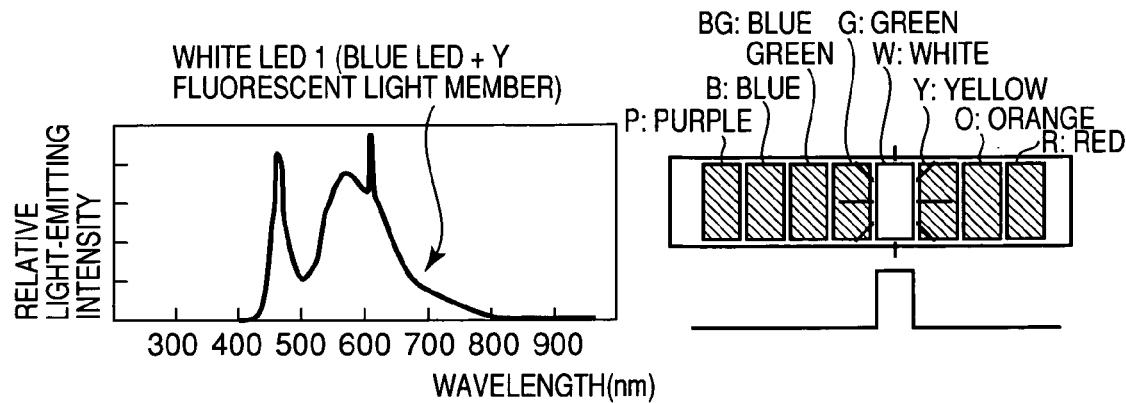
FIG. 39 is a schematic view showing a state of the light-emitting unit in which only white LED emits light.
Figure 40:
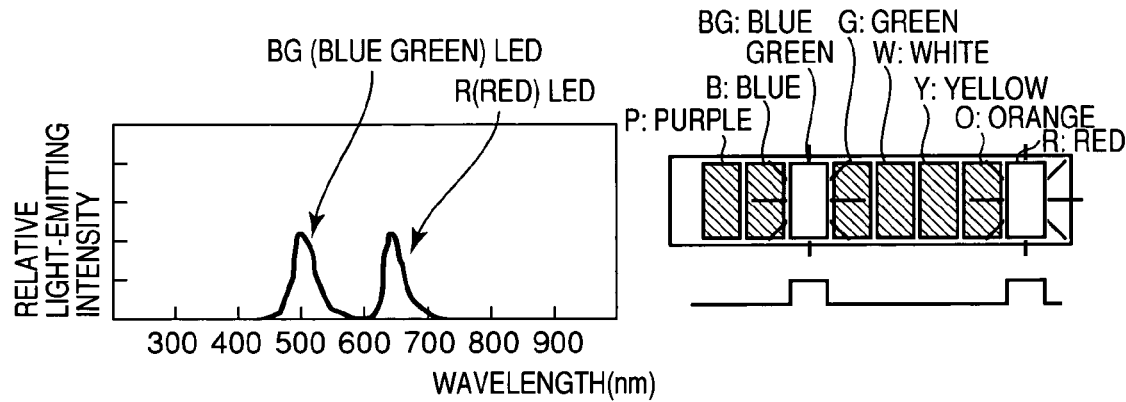
FIG. 40 is a schematic view showing a state of the light-emitting unit in which blue green LED and red LED emit light simultaneously.
Figure 41:
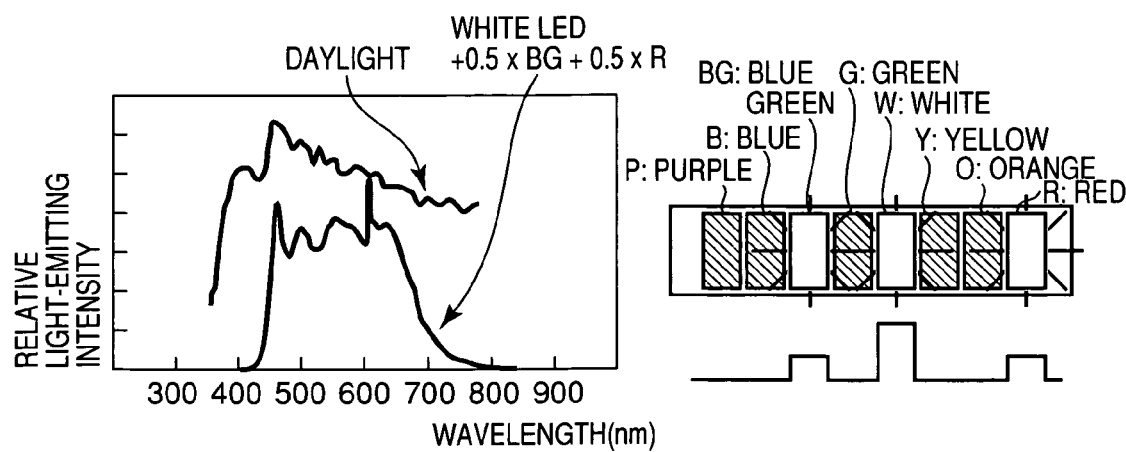
FIG. 41 is a schematic view showing a state of the light-emitting unit in which white, blue green, and red LED emit light simultaneously.

Apart from the above modifications, for example, the blue green LED and red LED are made to emit light of relative light-emitting intensity half as much as the relative light-emitting intensity of white LED as shown in FIGS. 39 and 40, that is, the spectral characteristic may be adjusted by correcting the light-emitting intensity of each LED, as sown in FIG. 41.

As described above, since color components expressed in terms of RGB components, chroma, color temperature, or spectral characteristic are changed, bias of spectral distribution characteristic of the light-emitting diode is qualified, for example, a spectral characteristic curve in each spectral graph is made flat or can be made to approach the spectral distribution characteristic of the daylight, whereby fidelity of colors of a photographed image is enhanced.

Figure 42:
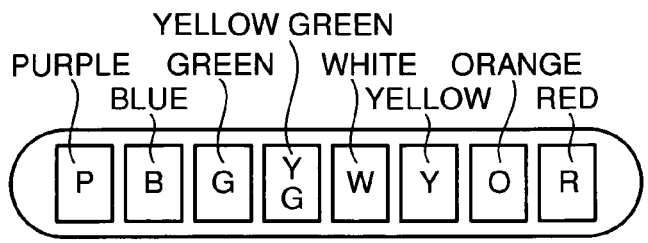
FIG. 42 is a schematic view illustrating an arrangement of LEDs in the light-emitting unit.

In case that LEDs are used as the light-emitting members in the light-emitting unit, such arrangement may be employed that purple (P), yellow green (YG), yellow (Y) and orange (O) LED in addition to R, G, B LED are disposed in a certain direction to correct spectral distribution characteristic, as shown in FIG. 42.

Figure 43:
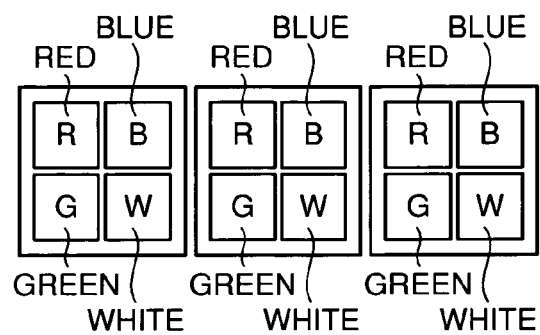
FIG. 43 is a schematic view illustrating other arrangement of LEDs in the light-emitting unit.

Further, an arrangement may be employed, in which R, G, B LED and white LED are disposed in matrix to form one assembly, and plural assemblies are disposed in a certain direction, as shown in FIG. 43.

Figure 44:
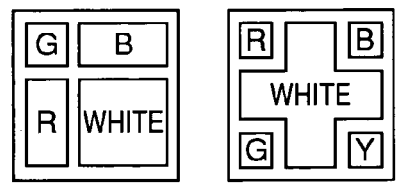
FIG. 44 is a schematic view illustrating still other arrangement of LEDs in the light-emitting unit.
Figure 45:
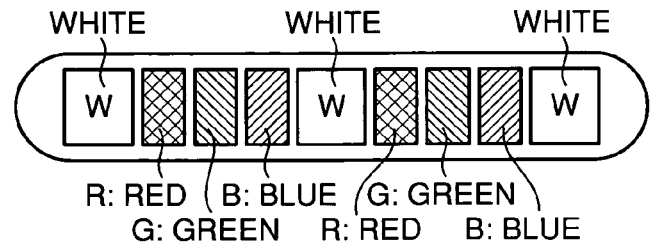
FIG. 45 is a schematic view illustrating another arrangement of LEDs in the light-emitting unit.
Figure 46:
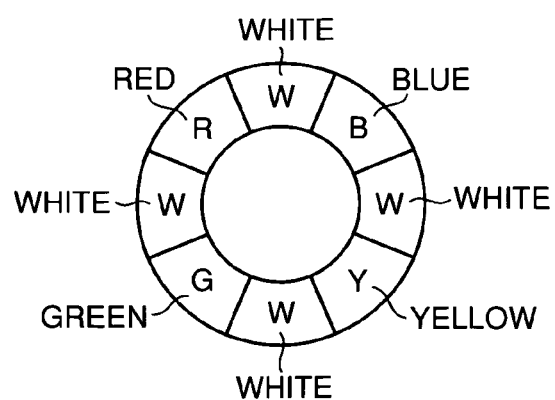
FIG. 46 is a schematic view illustrating still another arrangement of LEDs in the light-emitting unit.
Figure 47:
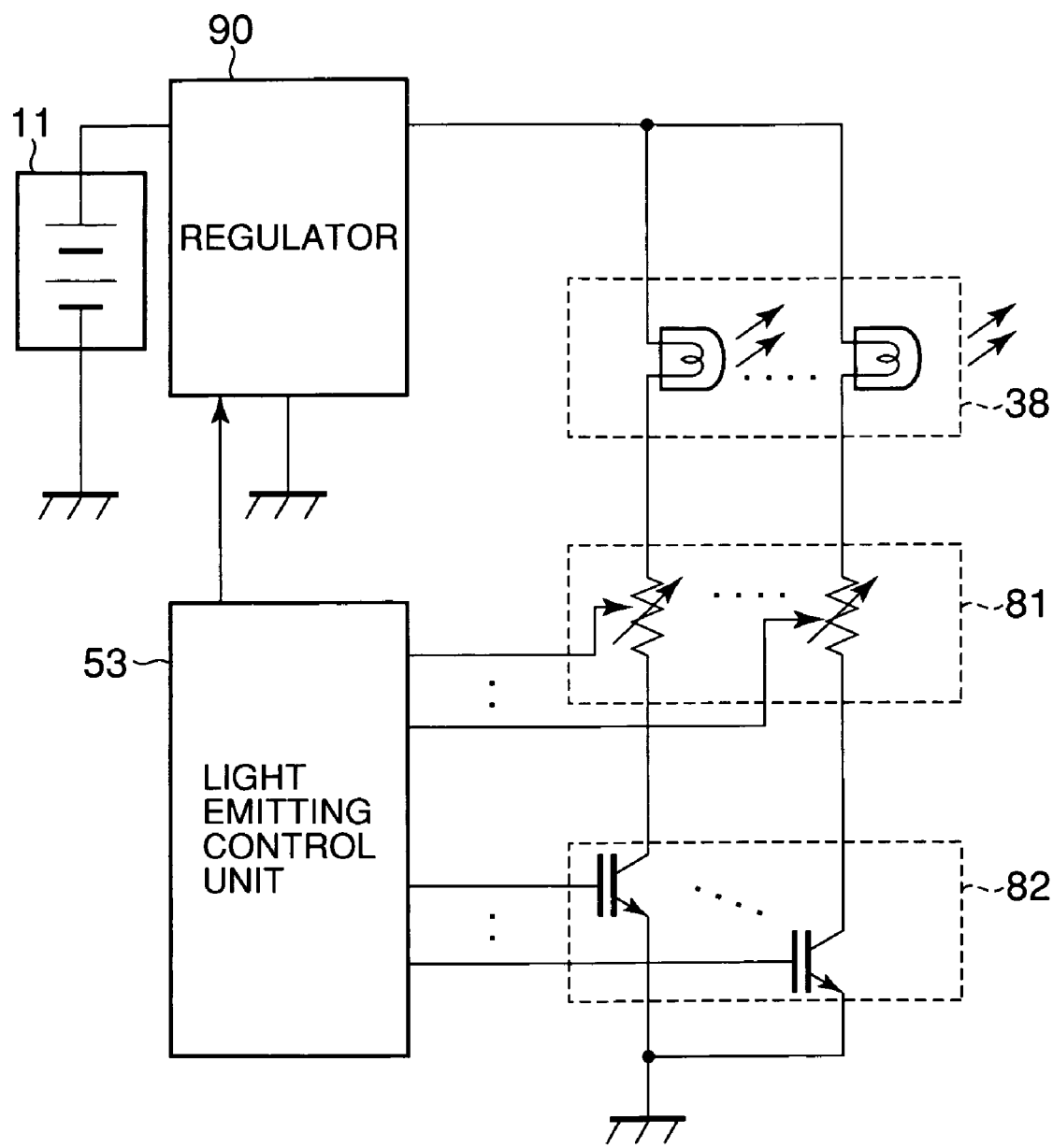
FIG. 47 is a block diagram of -a circuit configuration of a flashlight-emitting device using white lamps as light-emitting members.

Further, as shown in FIG. 44 to FIG. 46, an arrangement may be used, in which a white or a fundamental color light-emitting surface of LED is larger than other color light-emitting surface. As described above, since a combination of various color components generates various luminescent colors, the luminescent color of the flashlight emitting device can be changed every frame of image data, whereby strobe-light color bracket photographing operation can be performed.

[Fifth Modification]

In the embodiments of the invention and their modifications, flashlight discharging lamps and LEDs are used as the light-emitting members 40 of the flashlight-emitting device 26, bur for example, tungsten lamps, halogen lamps, flashlight discharging lamps for studio photographing, and light-emitting elements or illumination elements other than LEDs may be used. In the flashlight emitting device 26 employing these light-emitting members, a simple circuit configuration may be used, which comprises a regulator 90 including DC/DC converter and charge pump, restriction resisters 81, and light-emitting control switches 82.

Now, an arrangement using halogen lamps as the light-emitting members 40 will be described.

A variation ratio ($F/F_0$) of the characteristic of the halogen lamp, and a variation ratio of voltage ($V/V_0$) approximately meet the following expression (20).

$$F/F_0 = (V/V_0)^K \qquad (20)$$

where K denotes a constant value of each characteristic.

Figure 48:
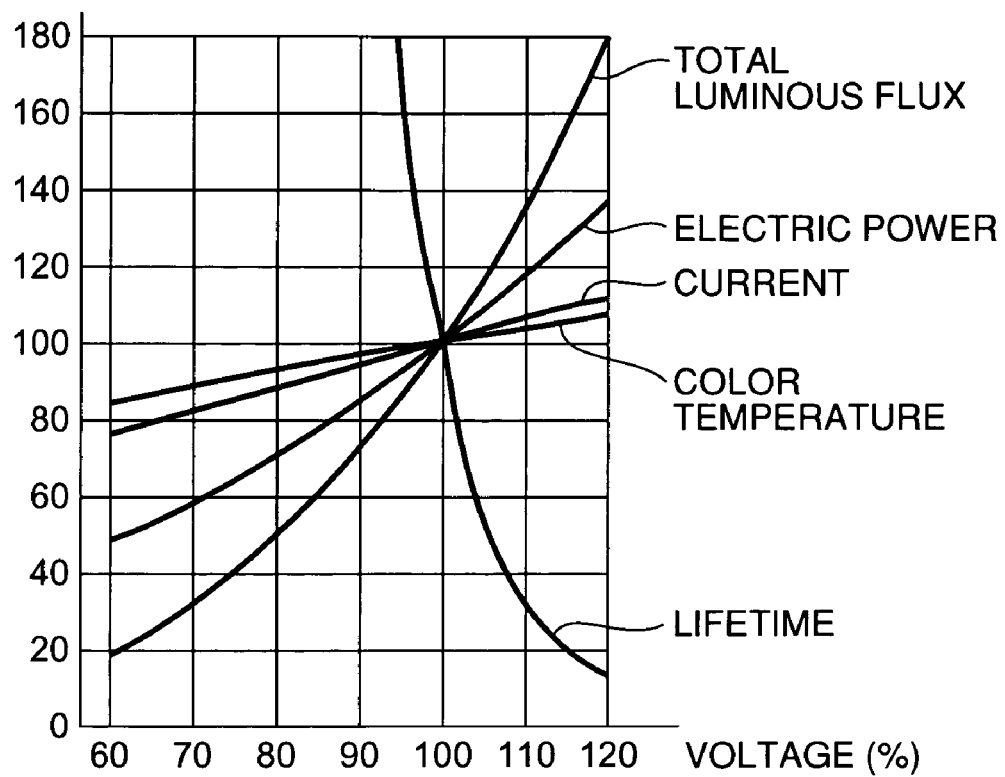
FIG. 48 is a graph showing a relationship between various characters of a halogen lamp and voltages.

For example, a variation ratio ($T/T_0$) of temperature and the variation ratio of voltage ($V/V_0$) meet the flowing expression (21), and increase in a driving voltage or current increases light-emitting intensity as shown in the graph of FIG. 48. With respect to a wavelength component and spectral distribution characteristic, a light-emitting ratio increases in a short wavelength range, the light-emitting ratio decreases in a long wavelength range, and color temperature T increases. Meanwhile, when decrease in driving voltage or current decreases light-emitting intensity in the short wavelength range, and increases the light-emitting ratio in a long wavelength range, and color temperature T decreases.

$$T/T_0 = (V/V_0)^{0.37} \quad (21)$$

As described above, in case that the flashlight discharging lamps or light-emitting elements other than LED are used as the light-emitting members 40, since a proportion relationship is established between the variation ratio (Fa/Fa$_0$) of Fa and the variation ration of voltage (V/V$_0$), color temperature or color tone of illumination light can be changed by controlling the driving voltage or current, whereby it may be possible to obtain more images having desired expression effects under the illumination condition including desired color temperature and spectral distribution characteristic.

[Sixth Modification

Figure 49:
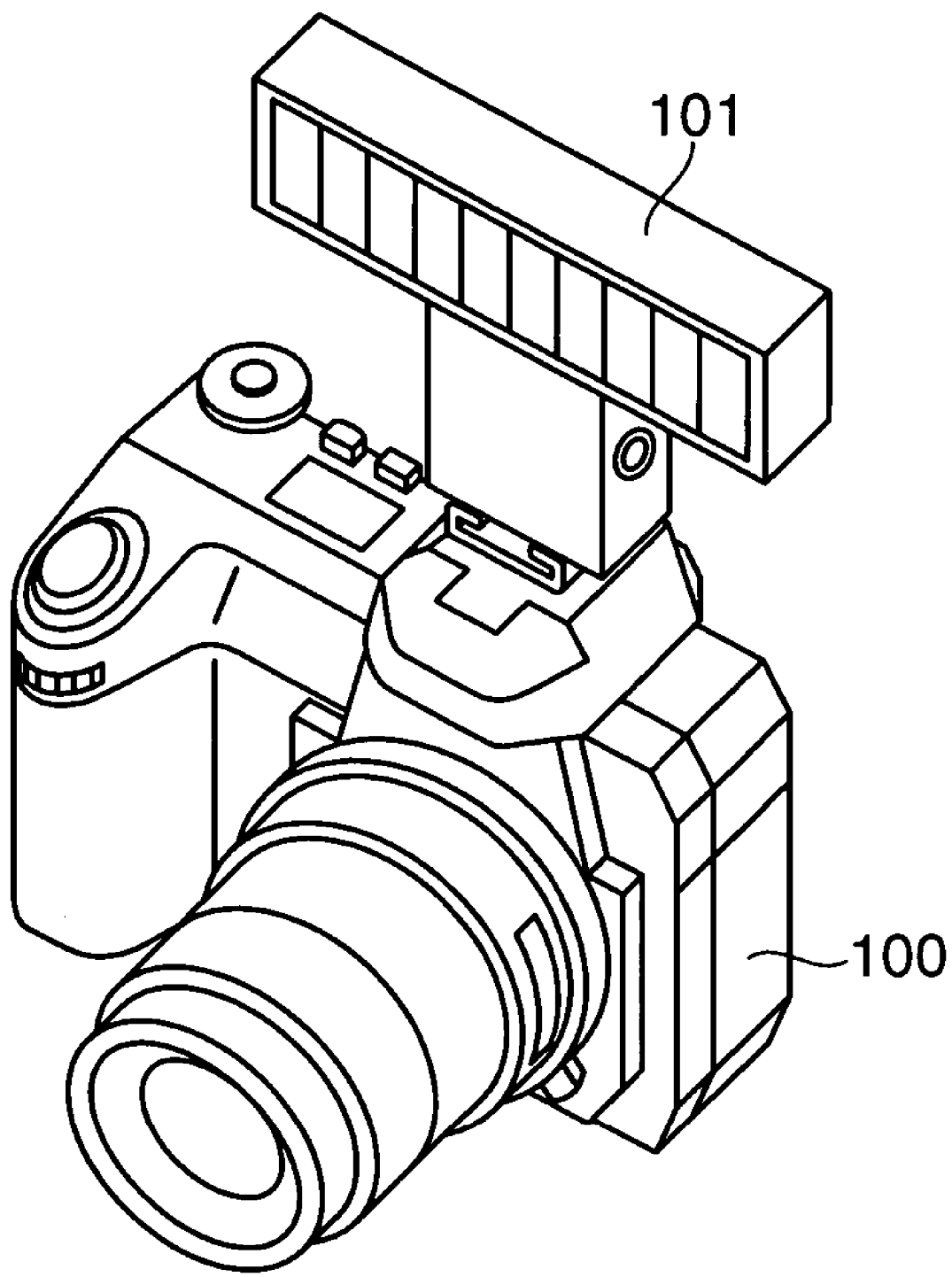
FIG. 49 is a perspective view showing an electronic camera with a flashlight-emitting device externally attached thereto.

The electronic camera 1 according to the present modification comprises the built-in flashlight-emitting device 26 of the present invention, but the camera is not limited to this arrangement. An electronic camera 101 may be modified so as to receive a detachable flashlight-emitting device 102, as shown in FIG. 49.

What is claimed is:

1. An electronic camera comprising:
    a light-emitting unit for emitting light, color components of which can be changed;
    a color-component obtaining unit for obtaining color components involved in any one of light from a light source for illuminating an object and light reflected by the object;
    a color-component determining unit for determining color components of light to be emitted by the light-emitting unit based on the color components obtained by the color-component obtaining unit; and
    a light-emitting control unit for making the light-emitting unit emit light involving color components determined by the color-component determining unit;
    wherein the light-emitting unit comprises plural light-emitting members for emitting respective color-component lights, and the light-emitting unit selects at least one light-emitting member from among the plural light-emitting members of the light-emitting unit to make the selected light-emitting members emit respective color component lights simultaneously, whereby the light emitting unit emits light involving the color components determined by the color-component determining unit; and
    wherein the electric camera further comprises an image pick-up unit for performing a photographing operation in response to a photographing instruction given by a user to photograph an object, and a photographing-operation control unit for controlling a light-emitting operation of the light-emitting unit and a photographing operation of the image pick-up unit; and
    wherein the photographing-operation control unit changes a combination of the light-emitting members of the light-emitting unit, which emit color-component light simultaneously, and makes the image pick-up unit continuously perform photographing operations plural time with color components of light corrected in response to one photographing instruction given by the user.

2. The electronic camera according to claim 1, wherein each color component is represented in terms of any one of an RGB component, chromaticity, color temperature, and spectral distribution characteristic.

3. The electronic camera according to claim 1, further comprising:
    a calculating unit for calculating color correcting amounts so as to correct-white balance of the color components obtained by the color-component obtaining unit based on the color components obtained by the color-component obtaining unit;
    wherein the color-component determining unit determines the color components of the light to be emitted by the light-emitting unit based on the color correcting amounts calculated by the calculating unit.

4. The electronic camera according to claim 1, further comprising:
    a calculating unit for calculating color correcting amounts so as to correct white balance of the color components obtained by the color-component obtaining unit based on the color components obtained by the color-component obtaining unit; and
    an adjusting unit for adjusting component ratios or gain of color signals of the color correcting amounts calculated by the calculating unit to correct the white balance;
    wherein the color-component determining unit determines the color components of the light to be emitted by the light-emitting unit based on the color components obtained by the color-component obtaining unit.

5. The electronic camera according to claim 1, wherein the photographing-operation control unit selects plural sets of plural light-emitting members selected from among the light-emitting members of the light-emitting unit to make the sets of plural light-emitting members emit color-component light successively in response to one photographing instruction given by the user.

6. The electronic camera according to claim 1, wherein the plural light-emitting members of the light-emitting unit are disposed along a line surrounding a lens unit of the image pick-up unit.

7. The electronic camera according to claim 1, wherein the plural light-emitting members of the light-emitting unit are disposed in different directions and at different angles, respectively.

8. The electronic camera according to claim 1, wherein the light-emitting members of the light-emitting unit each comprise a light-emitting diode.

9. The electronic camera according to claim 8, wherein color components emitted by the light-emitting diodes are subjected to additive color mixture to generate white flashlight.

* * * * *